(12) United States Patent
Jaramillo et al.

(10) Patent No.: US 12,195,121 B2
(45) Date of Patent: Jan. 14, 2025

(54) TRANSPORTATION TRAILER AND MACHINERY COUPLING ALIGNMENT SYSTEM

(71) Applicant: Solar Turbines Incorporated, San Diego, CA (US)

(72) Inventors: Jennifer L. Jaramillo, San Diego, CA (US); Gino H. Granda, Bonita, CA (US); Ryan T. Dietrich, San Diego, CA (US); Dale Randy Bonner, San Diego, CA (US); Peter Wochnowski, San Diego, CA (US); Sunder R. Ganesan, San Diego, CA (US); Juan Covarrubias, San Diego, CA (US); Colton Yalonis, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 615 days.

(21) Appl. No.: 17/508,847

(22) Filed: Oct. 22, 2021

(65) Prior Publication Data
US 2022/0185404 A1    Jun. 16, 2022

Related U.S. Application Data

(60) Provisional application No. 63/124,294, filed on Dec. 11, 2020.

(51) Int. Cl.
| | |
|---|---|
| *B62D 63/08* | (2006.01) |
| *B60D 1/64* | (2006.01) |
| *F02B 63/04* | (2006.01) |
| *F16P 1/02* | (2006.01) |
| *H02K 7/116* | (2006.01) |

(52) U.S. Cl.
CPC ............... *B62D 63/08* (2013.01); *B60D 1/64* (2013.01); *F02B 63/047* (2013.01); *F16P 1/02* (2013.01); *H02K 7/116* (2013.01)

(58) Field of Classification Search
CPC ................................ B60D 1/64; F02B 63/047
See application file for complete search history.

(56) References Cited

U.S. PATENT DOCUMENTS

| | | | |
|---|---|---|---|
| 4,440,265 A | 4/1984 | Spagnoli | |
| 4,992,669 A | 2/1991 | Parmley | |
| 6,765,304 B2 * | 7/2004 | Baten | F02B 63/04 290/1 A |
| 7,143,585 B2 | 12/2006 | Kuroki et al. | |
| 9,950,758 B2 | 4/2018 | Fong et al. | |
| 10,184,397 B2 | 1/2019 | Austin et al. | |

(Continued)

FOREIGN PATENT DOCUMENTS

| | | |
|---|---|---|
| CN | 110735713 A | 1/2020 |
| EP | 3299603 A1 | 3/2018 |

OTHER PUBLICATIONS

Extended European Search Report for European Patent Appln. No. 21208361.2-1004, mailed May 20, 2022 (6 pgs).

*Primary Examiner* — Kevin Hurley
*Assistant Examiner* — Hosam Shabara

(57) ABSTRACT

A turbomachinery power generation station can be too large and heavy for transportation. Thus, embodiments are disclosed for separating a full power generation station into road-ready turbine and generator trailers, as well as realigning and recoupling the trailers for operation of the power generation station at a desired destination.

20 Claims, 26 Drawing Sheets

(56) References Cited

U.S. PATENT DOCUMENTS

| | | | |
|---|---|---|---|
| 10,784,658 B2* | 9/2020 | Rochin Machado | B60P 3/00 |
| 11,598,477 B1* | 3/2023 | Seldenrust | F01D 15/10 |
| 11,788,668 B1* | 10/2023 | Seldenrust | B66F 11/04 |
| | | | 60/796 |
| 2016/0075387 A1 | 3/2016 | Fong | |
| 2018/0080376 A1* | 3/2018 | Austin | F16M 3/00 |
| 2019/0120134 A1 | 4/2019 | Goleczka | |

\* cited by examiner

TRANSPORTATION TRAILER AND MACHINERY COUPLING ALIGNMENT SYSTEM

CROSS-REFERENCE TO RELATED APPLICATIONS

The present application claims priority to U.S. Provisional Patent App. No. 63/124,294, filed on Dec. 11, 2020, which is hereby incorporated herein by reference as if set forth in full.

TECHNICAL FIELD

The embodiments described herein are generally directed to transportable machinery, and, more particularly, to a system for transporting and aligning turbomachinery.

BACKGROUND

A complete turbomachinery power generation station can be too large and heavy for transportation as a single unit on automotive roads. Thus, a system is needed for separating the station and rendering the separated equipment mobile-compliant with applicable road regulations (e.g., regarding size and weight). In addition, if the turbine and generator of a station are separated onto separate trailers, a system is required to precisely realign the mechanical equipment, including drivetrain frames, shafts, and/or the like, to prevent any rotor-dynamic issues. In particular, it would be desirable to have a system for uncoupling and recoupling the shafts of the turbine and generator that simplifies assembly and eliminates or minimizes the need for heavy lifting. It would also be desirable to have a protective cover for the coupling between the turbine and generator that can be easily stowed for transport and deployed before operation. The present disclosure is directed toward overcoming one or more of the problems discovered by the inventors.

SUMMARY

A power generation station is disclosed that comprises: a turbine trailer comprising a turbine compartment housing a turbine, wherein the turbine drives a first portion of a driveshaft; and a generator trailer comprising a generator compartment housing a generator, wherein the generator is driven by a second portion of the driveshaft, wherein the second portion of the driveshaft is configured to couple and decouple with the first portion of the driveshaft.

A method is disclosed for aligning and coupling two trailers representing separate portions of a power generation station, wherein the method comprises: positioning a first one of the two trailers; positioning a second one of the two trailers, such that guide pins in a rear interface of one of the two trailers are within receiving sockets in a rear interface of the other one of the two trailers; connecting a first fastening portion of one or more hydraulic cylinders in one of the two trailers to a corresponding second fastening portion in the other one of the two trailers, and pulling the other one of the two trailers towards the one of the two trailers; coupling the rear interfaces of the two trailers together; adjusting one or more lateral and vertical positioners in the rear interfaces of the two trailers; adjusting one or more hydraulic jacks on the two trailers to achieve drivetrain alignment of the two trailers; and coupling a portion of a driveshaft in one of the two trailers to a portion of the driveshaft in the other one of the two trailers.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
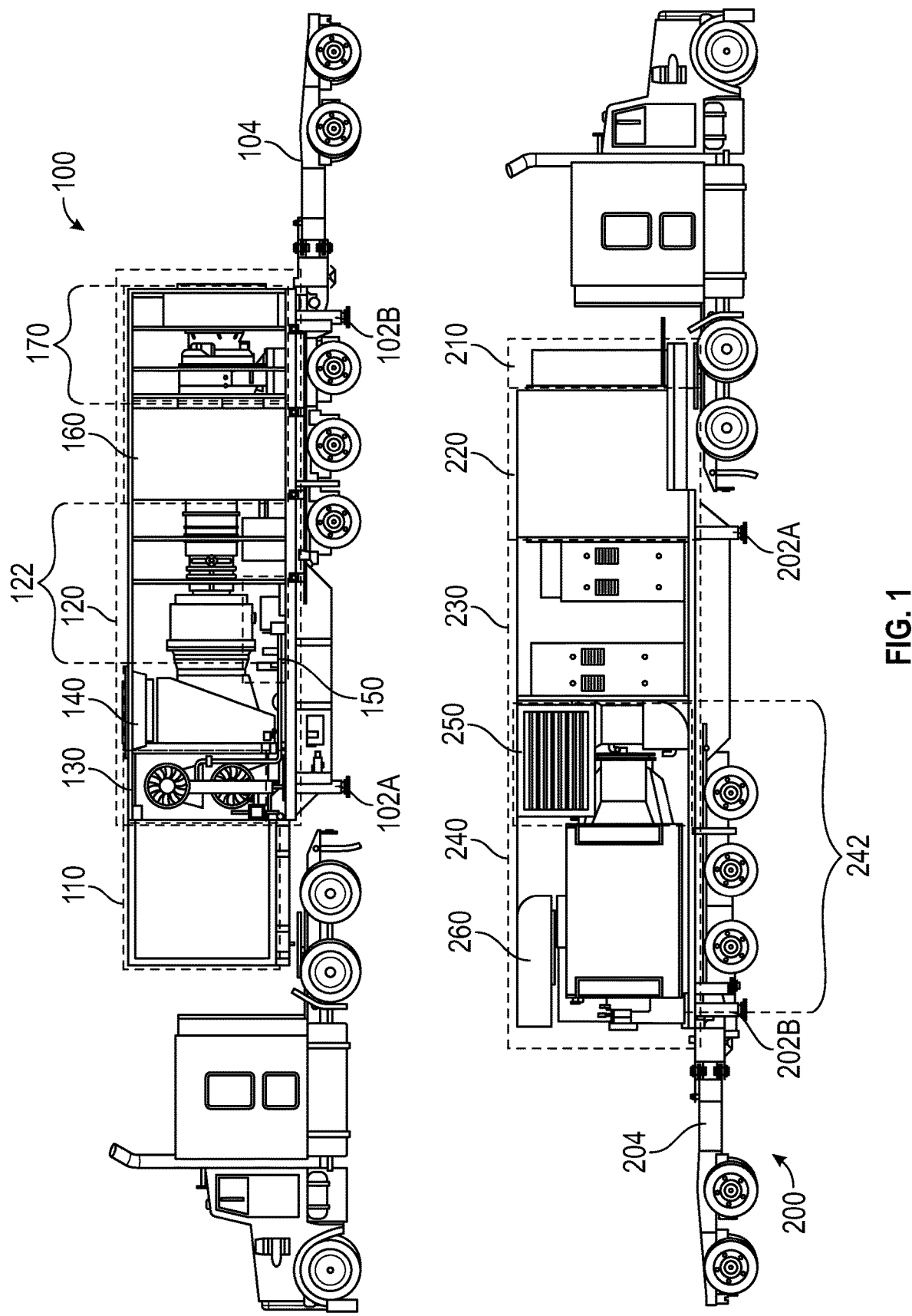
FIG. 1 illustrates a pair of trailers for transporting separate portions of a turbomachine, according to an embodiment.

FIG. 1 illustrates a pair of trailers for transporting separate portions of a turbomachine, according to an embodiment. In an embodiment, a turbine portion may be housed in a turbine trailer 100, and a generator portion may be housed in a generator trailer 200. Specifically, turbine trailer 100 may contain a turbine 122 and the turbine's subsystems, and generator trailer 200 may contain a generator 242 and the generator's subsystems. Each portion of the turbomachine may be integrated into its respective trailer frame and enclosures in a manner that is suitable for automotive road regulations. It should be understood that the turbine and generator portions each comprise a portion of a driveshaft that, when linked and operated, produces electric power. It should also be understood that a turbomachine may split between other components that are connected by a driveshaft (e.g., between a turbine and compressor or pump), in addition to or as an alternative to splitting the turbomachine between the turbine and generator. More generally, the disclosed embodiments may be utilized for aligning and coupling any mechanical system with a split shaft (e.g., reciprocating engines).

In the illustrated embodiment, trailer 100 comprises a flatbed with a plurality of hydraulic jacks 102 (e.g., four hydraulic jacks, each near a different corner of the flatbed, including two front hydraulic jacks 102A and two rear hydraulic jacks 102B). Similarly, trailer 200 may comprise a flatbed with a plurality of hydraulic jacks 202 (e.g., four hydraulic jacks, each near a different corner of the flatbed, including two front hydraulic jacks 202A and two rear hydraulic jacks 202B). Each flatbed of trailers 100 and 200 may comprise a tridem of three rear axles. However, it should be understood that other numbers and configurations of axles are also possible.

In addition, trailers 100 and 200 may comprise boosters 104 and 204, respectively, which act to distribute ground loading over additional axles. However, it should be understood that, in an alternative embodiment, booster 104 and/or 204 may be omitted. In an embodiment which utilizes booster 104 and 204, each booster 104 and 204 may be removable from its respective trailer 100 and 200, to facilitate coupling of trailers 100 and 200.

In an embodiment, each trailer 100 and 200 utilizes a modular and compact layout that packages the components of its respective portion of the turbomachine in an efficient manner. For example, packaging support systems for the turbine and generator (e.g., fuel, filtration, ventilation, cooling, controls, lubrication, environmental and fire protection, etc.) may be arranged in a practical manner to maintain performance and serviceability. FIG. 1 illustrates one example of such layouts. Specifically, in the illustrated embodiment, turbine trailer 100 comprises, from front to back, a lube oil compartment 110 and a turbine compartment 120. Turbine compartment 120 may comprise turbine 122, one or more turbine enclosure vent fans 130, a turbine exhaust 140, a low emissions system 150 (e.g., a SoLoNOx™ gas fuel system), a turbine air inlet 160, and a turbine enclosure vent inlet 170. In the illustrated embodiment, generator trailer 200 comprises, from front to back, a fire suppression cabinet 210, an electric equipment compartment (EEC) 220, a medium voltage compartment 230, and a generator compartment 240. Generator compartment 240 may comprise generator 242, a generator compartment vent inlet 250 and a generator exhaust 260. However, it should be understood that other layouts may be used, that components may be omitted or added in alternative embodiments, and that not all components of trailers 100 and 200 will be specifically discussed herein.

FIGS. 2-14 illustrate the processes and systems for aligning and coupling trailers 100 and 200, according to an embodiment. The illustrated alignment process may be performed prior to sale or delivery, for example, in the factory. In this case, the alignment process should be performed on a level planar surface. Once this initial alignment process has been completed, certain adjustment mechanisms may be set or locked in place for future repeatability and/or water marks may be scored for future reference. This initial alignment process can reduce the time and effort required for future alignment processes using the same pair of trailers 100 and 200.

While the alignment process will be illustrated with the positioning of generator trailer 200 first, it should be understood that the alignment process may instead begin with positioning of turbine trailer 200. In other words, trailers 100 and 200 may be positioned in either order.

In addition, while certain features may be illustrated as being positioned on one trailer and mating with a corresponding feature on the other trailer, it should be understood that any of these mating features may be reversed with respect to the trailers on which they are positioned. Thus, for example, a first feature that is illustrated as positioned on trailer 100 and mating with a second feature that is illustrated as positioned on trailer 200 may, in an alternative embodiment, be positioned on trailer 200, with the second feature positioned on trailer 100. Thus, any alignment feature that is illustrated herein as being positioned on trailer 100 may instead be positioned on trailer 200, and vice versa.

Figure 2:
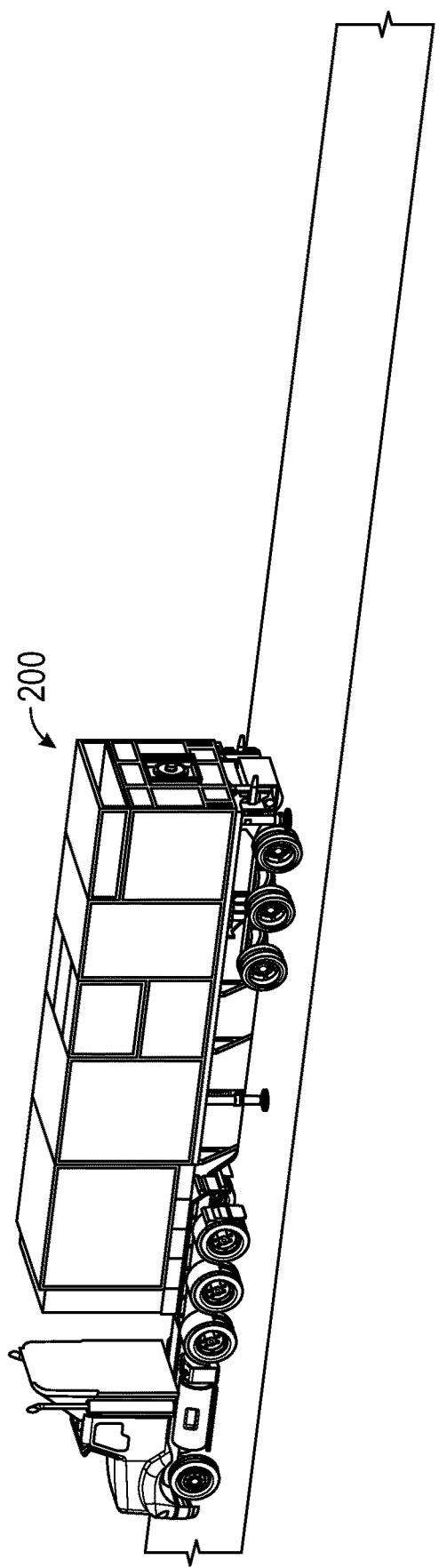
FIGS. 2-4 illustrate positioning of a pair of trailers, according to an embodiment.
Figure 3:
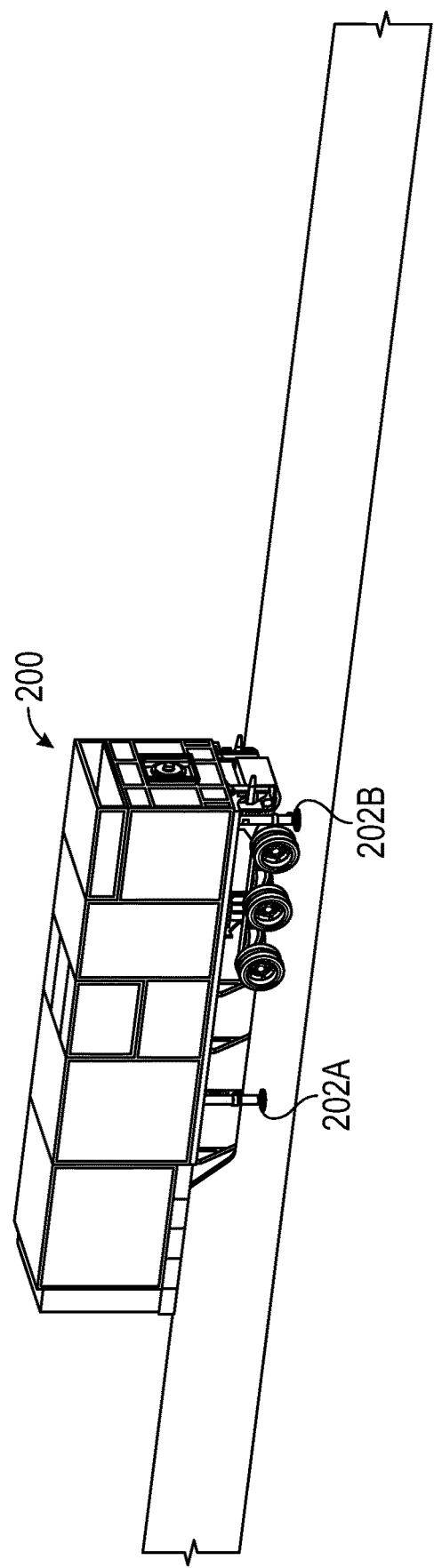

As illustrated in FIG. 2, generator trailer 200 may be positioned by tractor (e.g., semi-truck). Then, as illustrated in FIG. 3, generator trailer 200 may be detached from the tractor. Prior to detachment, front hydraulic jacks 202A may be lowered to set generator trailer 200 in place. Then, the air may be disconnected from generator trailer 200 to lock the brakes of generator trailer 200, and the tractor may be removed from generator trailer 200. Next, rear hydraulic jacks 202B may be lowered under control of a control system that automatically lowers hydraulic jacks 202B until solid ground is determined. The suspension air may be dumped from the suspension of generator trailer 200 to transfer the trailer's weight to hydraulic jacks 202. Rough leveling may be performed to level generator trailer 200 at its current nominal height.

Figure 4:
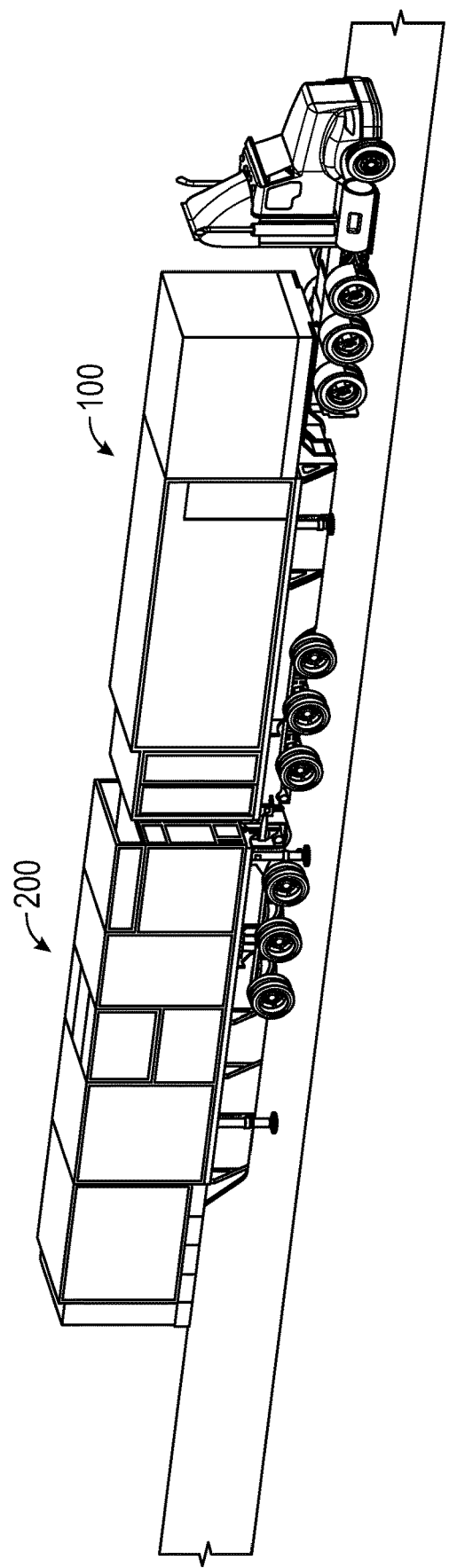
Figure 5:
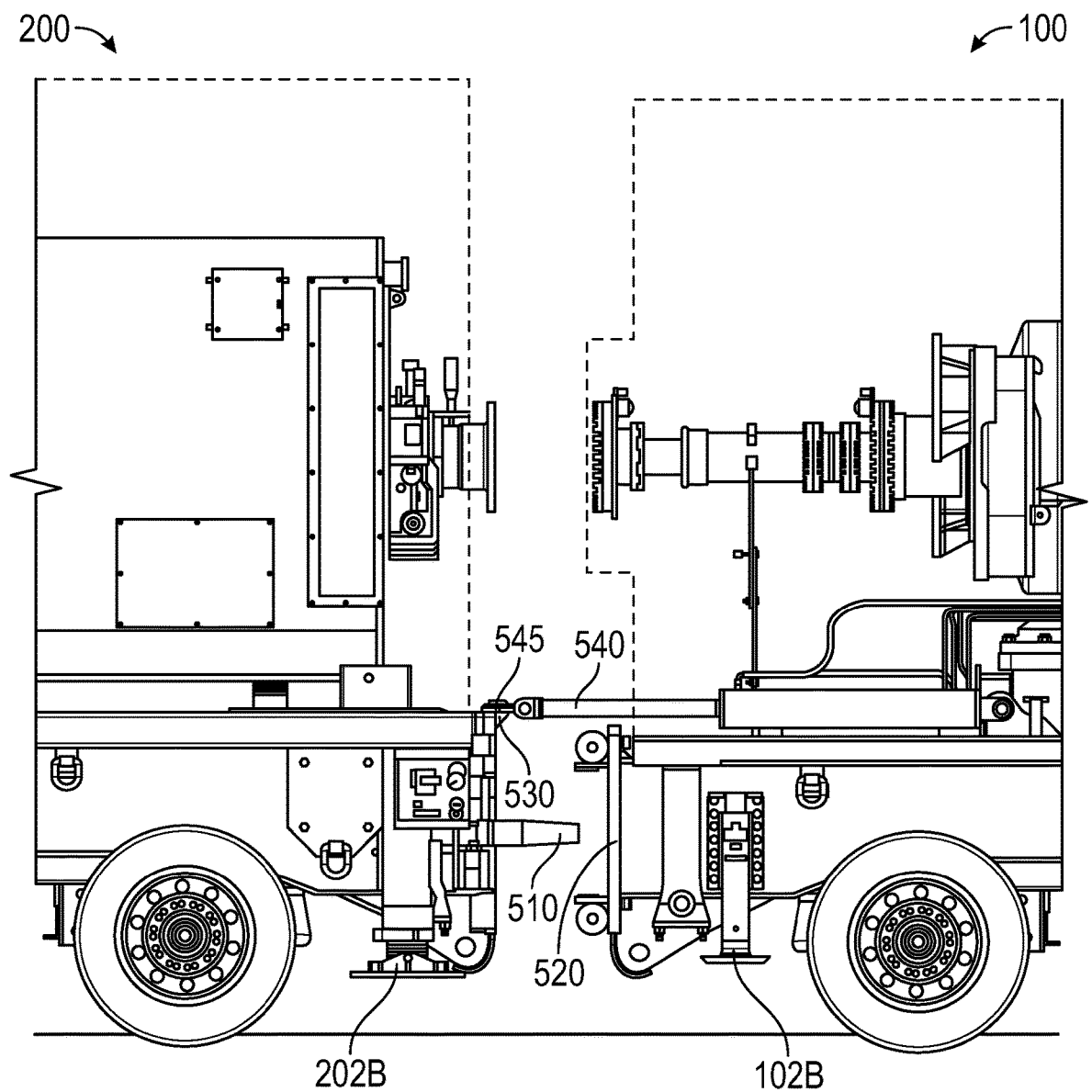
FIGS. 5 and 6 illustrate mating features on a pair of trailers, according to an embodiment.

As illustrated in FIG. 4, turbine trailer 100 may be backed into coarse alignment with generator trailer 200 using a tractor (e.g., semi-truck). As illustrated in FIG. 5, trailers 100 and 200 may comprise mating features 510/520 and/or 530/540. For example, mating features 510/520 may comprise a guide pin 510 on the rear of one trailer (e.g., generator trailer 200) that is configured to mate with a receiver socket 520 on the rear of the other trailer (e.g., turbine trailer 100). It should be understood that there may be a guide pin 510 on both sides of one of the trailers that each mate with a corresponding receiver socket 520 on respective sides of the other trailer. Thus, turbine trailer 100 may be backed straight towards generator trailer 200 until guide pins 510 are at least partially inserted into receiver sockets 520. Once turbine trailer 100 has been positioned, the tractor may be placed into a neutral gear or the kingpin of the tractor can be disengaged from generator trailer 100, so that mating features 530/540 can be used to completely join the two trailers 100 and 200. Front hydraulic jacks 102A be lowered, and then the air may be disconnected from turbine trailer 100 to lock the brakes of turbine trailer 100, and the tractor may be removed from turbine trailer 100. Alternatively, turbine trailer 100 can be backed in cautiously until completely joined with trailer 200 at their rear interfaces.

Figure 6:
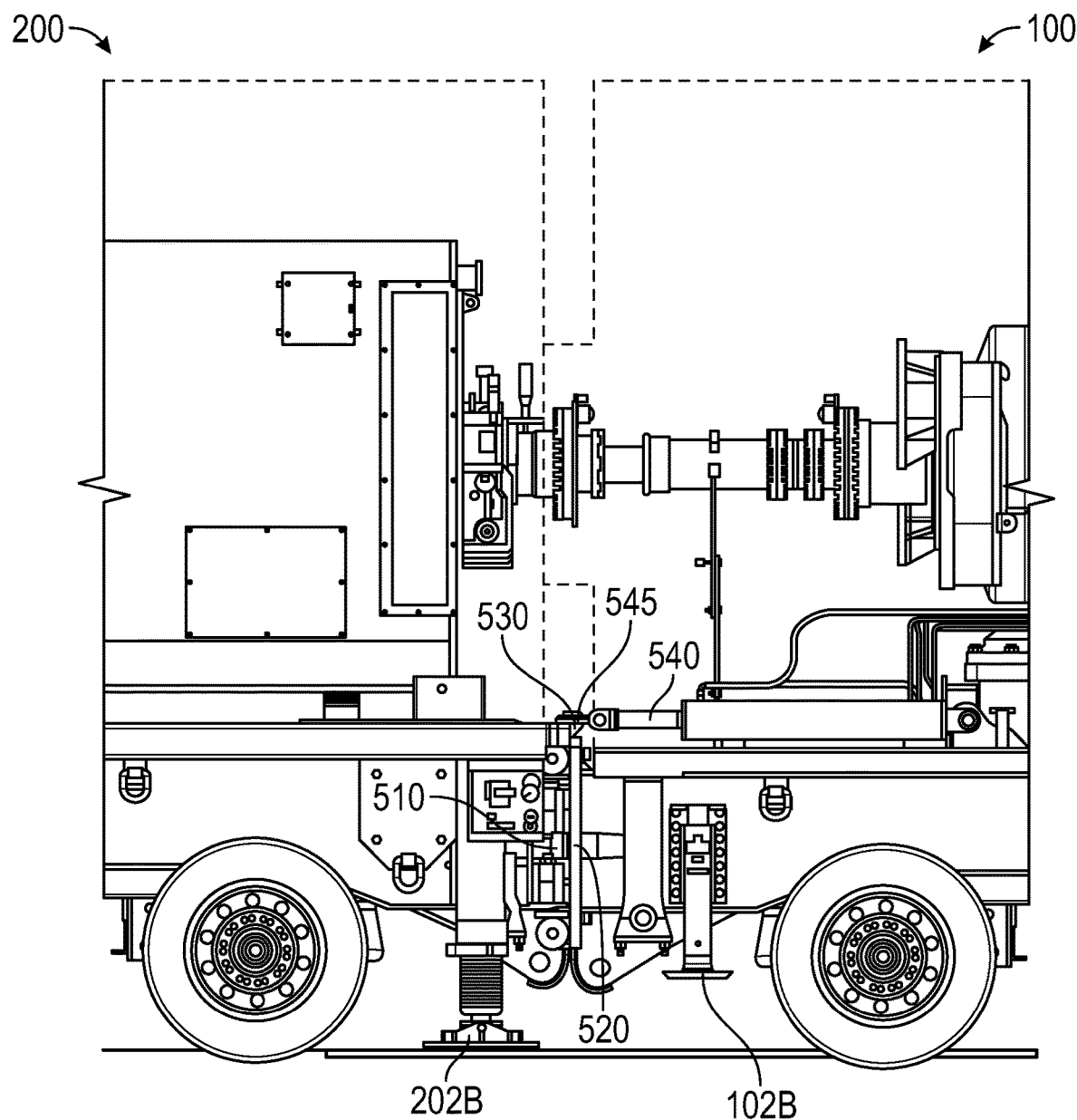

Next, mating features 530/540 may be employed to pull trailers 100 and 200 together. For example, mating features 530/540 may comprise a hydraulic cylinder 540 at the rear of one trailer (e.g., turbine trailer 100) with an eye 545 on one end that is configured to engage with a post 530 on the rear of the other trailer (e.g., generator trailer 200). It should be understood that there may be a hydraulic cylinder 540 on both sides of one of the trailers that each comprise an eye 545 that is configured to engage a corresponding post 530 on respective sides of the other trailer. For example, each eye 545 may be looped over a corresponding post 530 and fixed to post 530 by any known fastening means (e.g., bolt, screw, pin, etc.). Once engaged, hydraulic cylinders 540 may be operated to retract eyes 545, to thereby pull trailers 100 and 200 together via the engagement between eyes 545 and posts 530, as shown in FIG. 6. Notably, when trailers 100 and 200 are pulled together in this manner, guide pins 510 are pulled fully into their corresponding receiver sockets 520. Once guide pins 510 are fully engaged with receiver sockets 520, eyes 545 may be detached from posts 530, and hydraulic cylinders 540 may be retracted. In an alternative embodiment, eyes 545 may be replaced with hooks, and posts 530 may be replaced with eyes that are configured to receive the hooks, so as to engage with the hooks. In this embodiment, trailers 100 and 200 may be pulled together in a similar manner using hydraulic cylinders 545.

Figure 7:
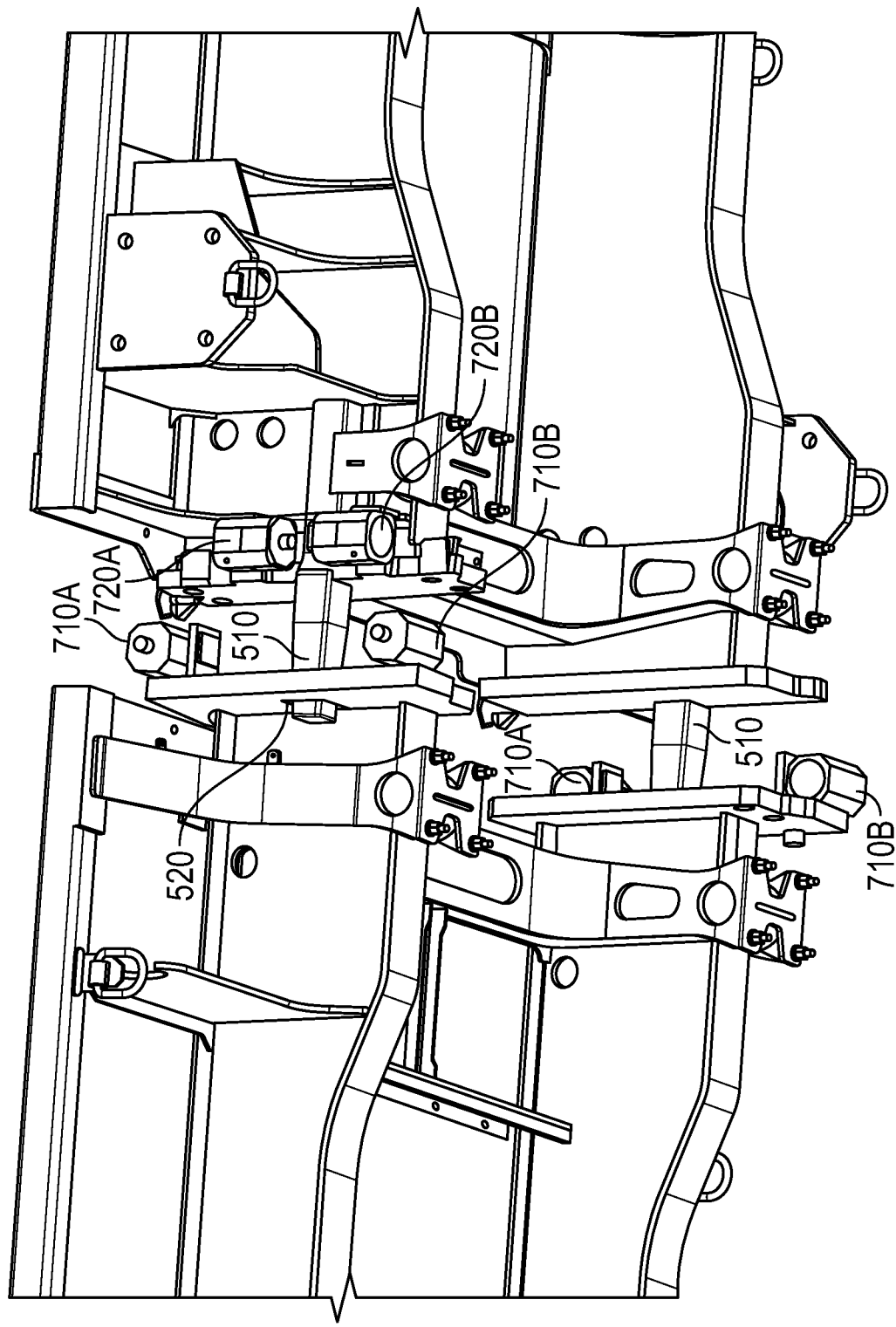
FIGS. 7-9 illustrate positioners for fine alignment, according to an embodiment.

FIG. 7 illustrates systems for fine alignment, according to an embodiment. For example, the fine-alignment systems may comprise lateral positioners 710 and vertical positioners 720. Ideally, the fine alignment would be performed prior to sale or delivery of trailers 100 and 200 and then the positions of positioners 710 and 720 locked in place, such that the fine alignment only needs to be performed once. However, it should be understood that the fine alignment may be performed after sale or delivery or each time that trailers 100 and 200 are assembled. In addition, even in embodiments in which the fine alignment is performed before sale or delivery, minor adjustments may need to be made over time.

As illustrated, there may be at least one pair of lateral positioners 710, positioned to laterally face each other on opposing sides of the rear of a trailer (e.g., turbine trailer 100). For example, there may be two pairs of lateral positioners 710, including a pair 710A that face each other on a lower end of the rear flatbed interface, and a pair 710B that face each other on an upper end of the rear flatbed interface. In addition, there may be two pairs of vertical positioners 720. Each pair of vertical positioners 720 may comprise a first vertical positioner 720A that is vertically aligned above a second vertical positioner 720B and oriented in the opposite direction to second vertical positioner 720B. A first pair of vertical positioners 720A/720B may be on one side of the rear of a trailer (e.g., generator trailer 200), that is different than the trailer on which the lateral positioners 710 are positioned, and the second pair of vertical positioners 720A/720B may be on the opposite side of the rear of the same trailer as the first pair of vertical positioners 720A/720B.

Figure 8:
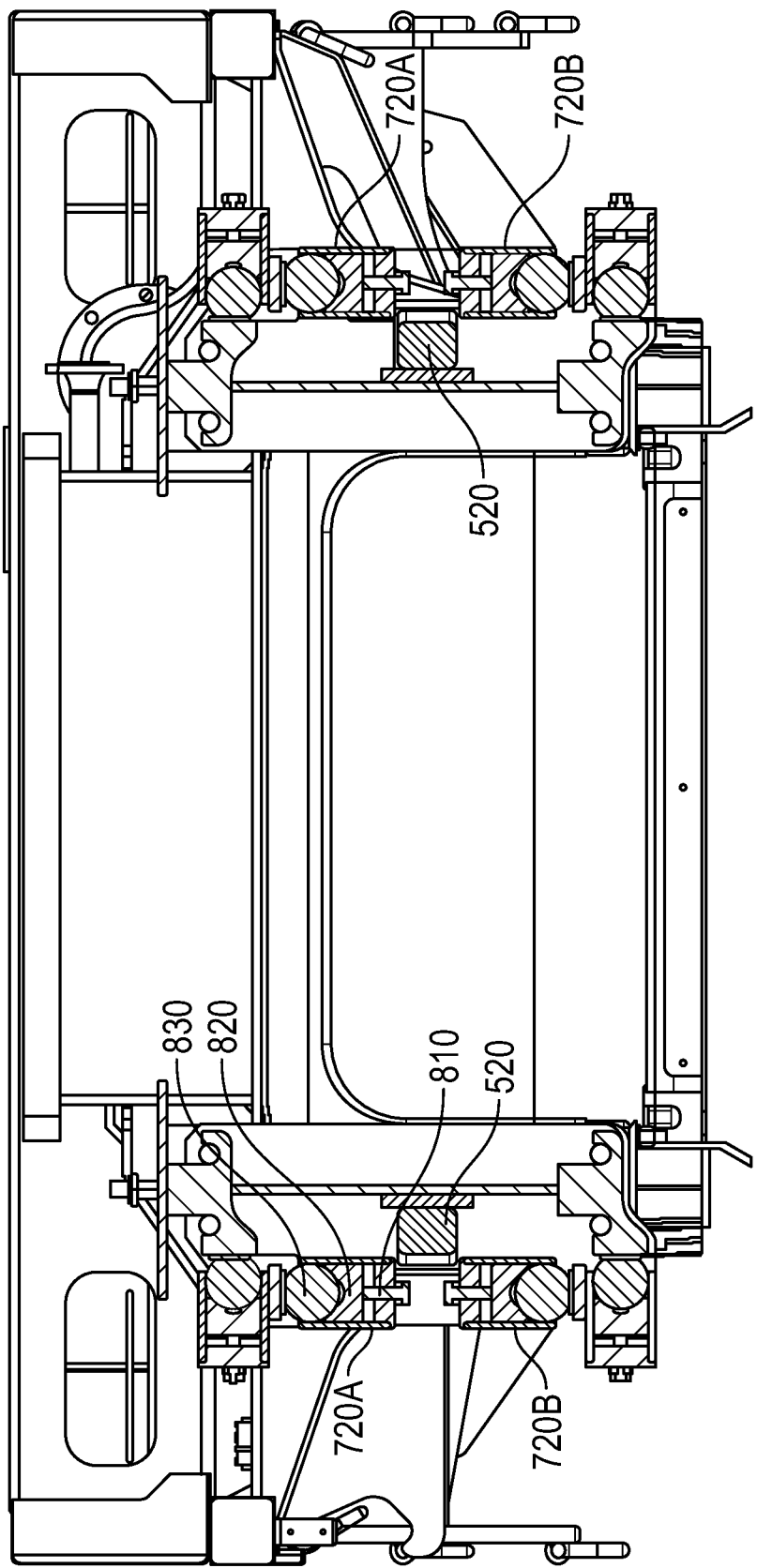
Figure 9:
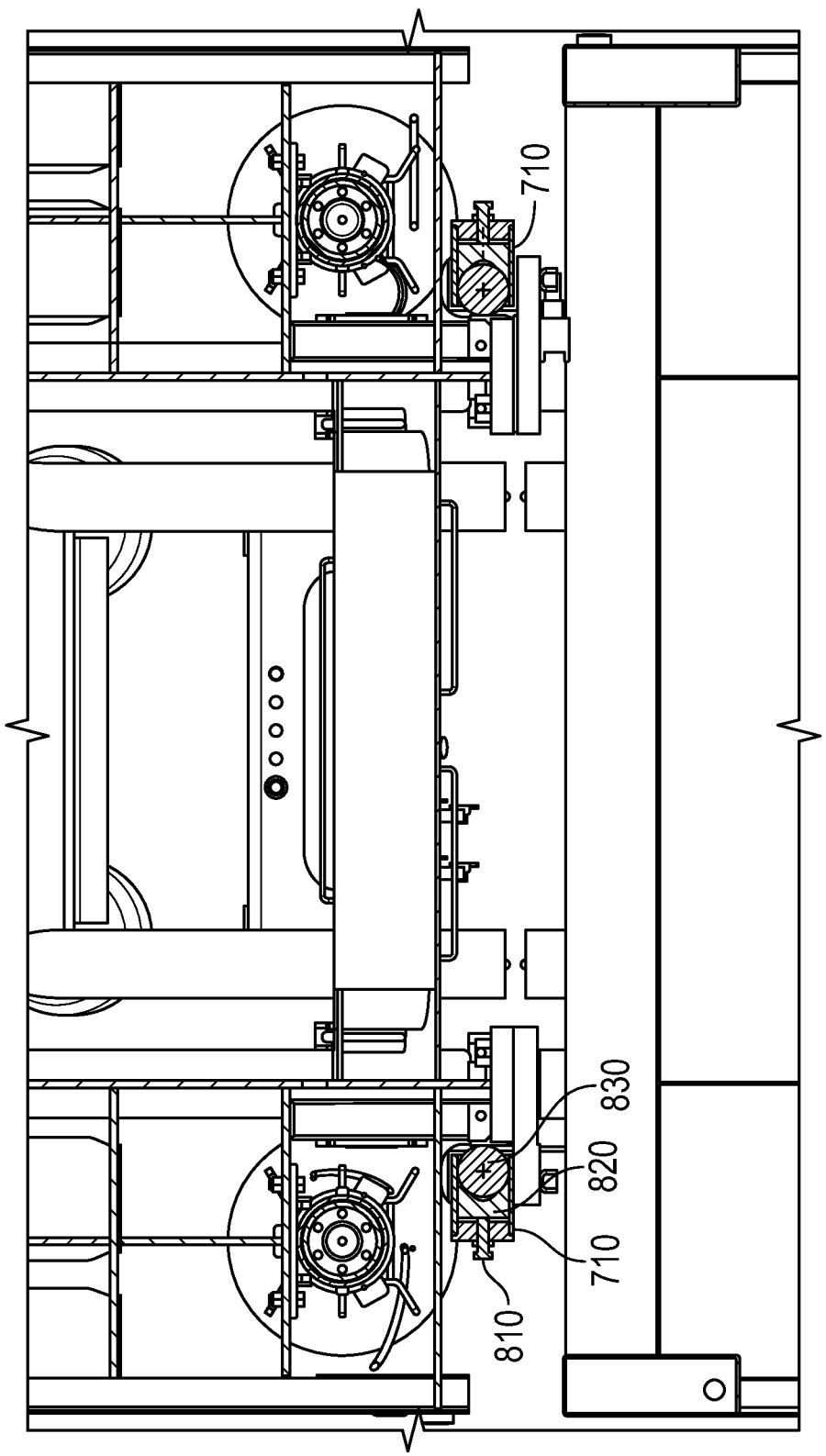

In an embodiment, each of positioners 710 and 720 may comprise a jacking bolt. FIG. 8 illustrates a cross-sectional front view of vertical positioners 720A and 720B, and FIG. 9 illustrates a cross-sectional top view of lateral positioners 710, according to an embodiment. In the illustrated embodiment, each jacking bolt comprises a bolt 810, a ball socket 820, and a kinematic ball 830. Bolt 810 may be turned to push ball socket 820 against kinematic ball 830, to press kinematic ball 830 against a surface of the respective trailer, to thereby effect fine movements of the respective trailer. However, it should be understood that other types of jacking bolts or positioners or any other linear adjustment mechanism may be used, and that lateral positioners 710 and vertical positioners 720 may utilize different types of jacking bolts or other positioners than each other. In any case, lateral positioners 710 effect fine movements in the lateral directions, and vertical positioners 720 effect fine movements in the vertical directions, so that the positions of turbine trailer 100 and generator trailer 200, relative to each other, may be finely tuned. It should be understood that trailers 100 and 200 may move on their respective suspensions as positioners 710 and 720 are adjusted. Utilizing positioners 710 and 720, water marks may be aligned, the driveshafts may be aligned, and/or the like.

Figure 10:
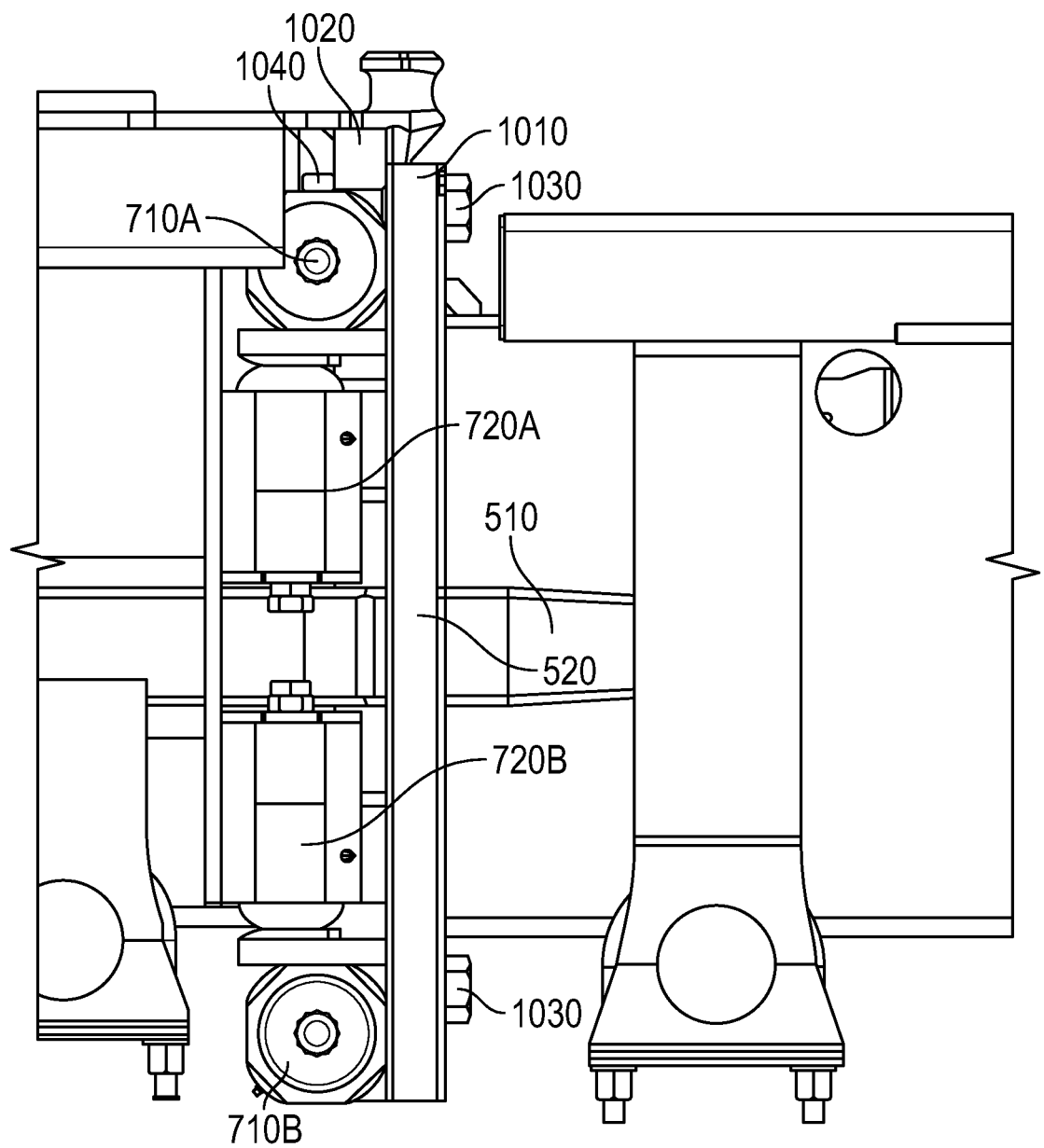
FIG. 10 illustrates a coupling interface between a pair of trailers, according to an embodiment.

FIG. 10 illustrates the coupling interface between trailers 100 and 200, according to an embodiment. With guide pin 510 fully inserted into receiver socket 520 and with fine alignment having been performed, a flange 1010 of turbine trailer 100 becomes flush with a flange 1020 of generator trailer 200. Bolts 1030 may be inserted through bolt holes from one side (e.g., from the side of turbine trailer 100) and mated with a nut 1040 on the other side (e.g., on the side of generator trailer 200) to clamp and hold flanges 1010 and 1020 therebetween. It should be understood that flanges 1010 and 1020 may be joined by a plurality of pairs of bolts 1030 and nuts 1040, in at least the four corners of flanges 1010 and 1020 (e.g., on both sides of trailers 100 and 200).

In an embodiment, bolts 1030 and nuts 1040 may be loosely mated, after inserting guide pins 510 into receiver sockets 520, and prior to the fine alignment using positioners 710 and 720. Once fine alignment has been performed, bolts 1030 and nuts 1040 may then be firmly mated to fix trailers 100 and 200 in their final relative positions.

Although not illustrated, in an embodiment, inflatable bags (e.g., AeroGo™ Aero-Casters or similar products) may be used to facilitate alignment of trailers 100 and 200 (e.g., on rough terrain). For example, once generator trailer 100 has been placed, inflatable planks may be placed behind generator trailer 100 in a configuration designed to support the wheels of turbine trailer 200, and turbine trailer 200 may be backed up such that the inflatable planks are underneath the wheels of turbine trailer 200. In addition, once turbine trailer 200 has been positioned, an inflatable plank may be placed under the jacks of turbine trailer 100 to further support turbine trailer 200 during alignment. The inflatable planks may be inflated and deflated as needed to allow turbine trailer 100 to slide laterally and/or raise vertically. Once the trailers 100 and 200 have been aligned, the inflatable planks may be removed.

Figure 11:
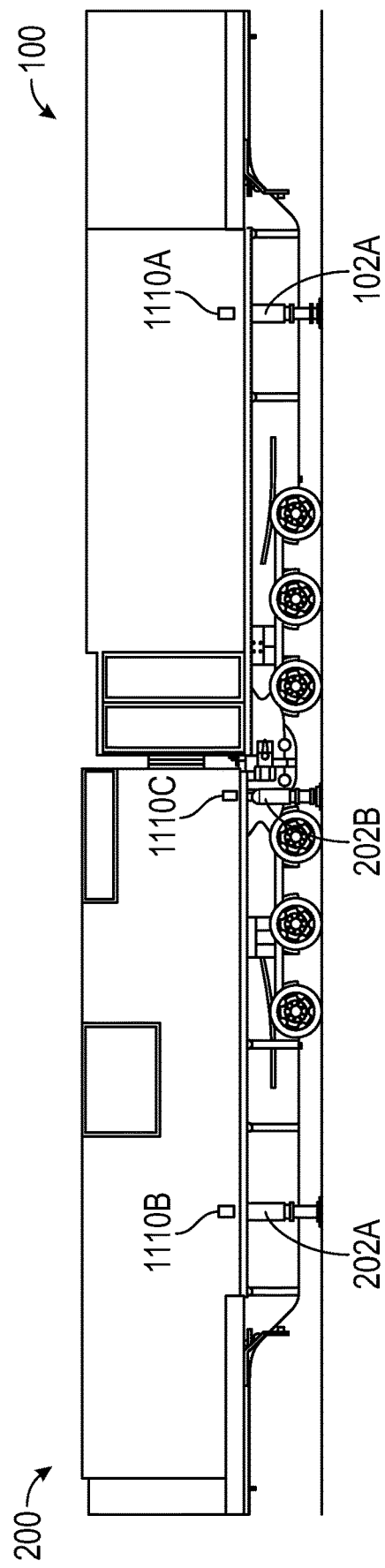
FIG. 11 illustrates systems for aligning the drivetrains of coupled trailers, according to an embodiment.

FIG. 11 illustrates systems for aligning the drivetrains of coupled trailers 100 and 200, according to an embodiment. In particular, trailers 100 and 200 may comprise one or more inclinometers 1110 that generate an output signal indicating the angle of inclination of the respective trailer. In the illustrated embodiment, turbine trailer 100 comprises an inclinometer 1110A on both sides, near front hydraulic jacks 102A, and generator trailer 200 comprises a pair of inclinometers 1110B, near front hydraulic jacks 202A, and 1110C, near rear hydraulic jacks 202B, on both sides. However, it should be understood that other numbers and arrangements of inclinometers 1110 may be used.

In an embodiment, a control system may receive the output signals from each inclinometer 1110 and control hydraulic jacks 102/202 on both trailers 100 and 200, based on those output signals and according to an algorithm, to automatically and electromechanically control hydraulic jacks 102/202 to move the outputs of inclinometers 1110 to their original respective values, as captured in the initial drivetrain alignment process (e.g., and recorded in memory of the control system as a factory setting). This ensures that, during any subsequent alignment process, the coupled trailers 100 and 200 are always set to the same relative positions, independent of the particular characteristics of the ground.

These positions represent the alignment between trailers 100 and 200 that is required for precision drivetrain alignment between their respective payloads (e.g., turbine 122 and generator 242). The control system may be integral to one or both of trailers 100 and 200, or may be an external system that is communicatively connected (e.g., via wired or wireless connections) to inclinometers 1110 and actuation systems of hydraulic jacks 102/202 in both trailers 100 and 200. The control system may be programmed to, after setup of the turbomachine (e.g., comprising turbine 122 and generator 242), check alignment of trailers 100 and 200 over time and make periodic adjustments to ensure that trailers 100 and 200 remain in the same relative positions. In an embodiment, hydraulic jacks 102 and/or 202 may also be manually controlled.

Figure 12:
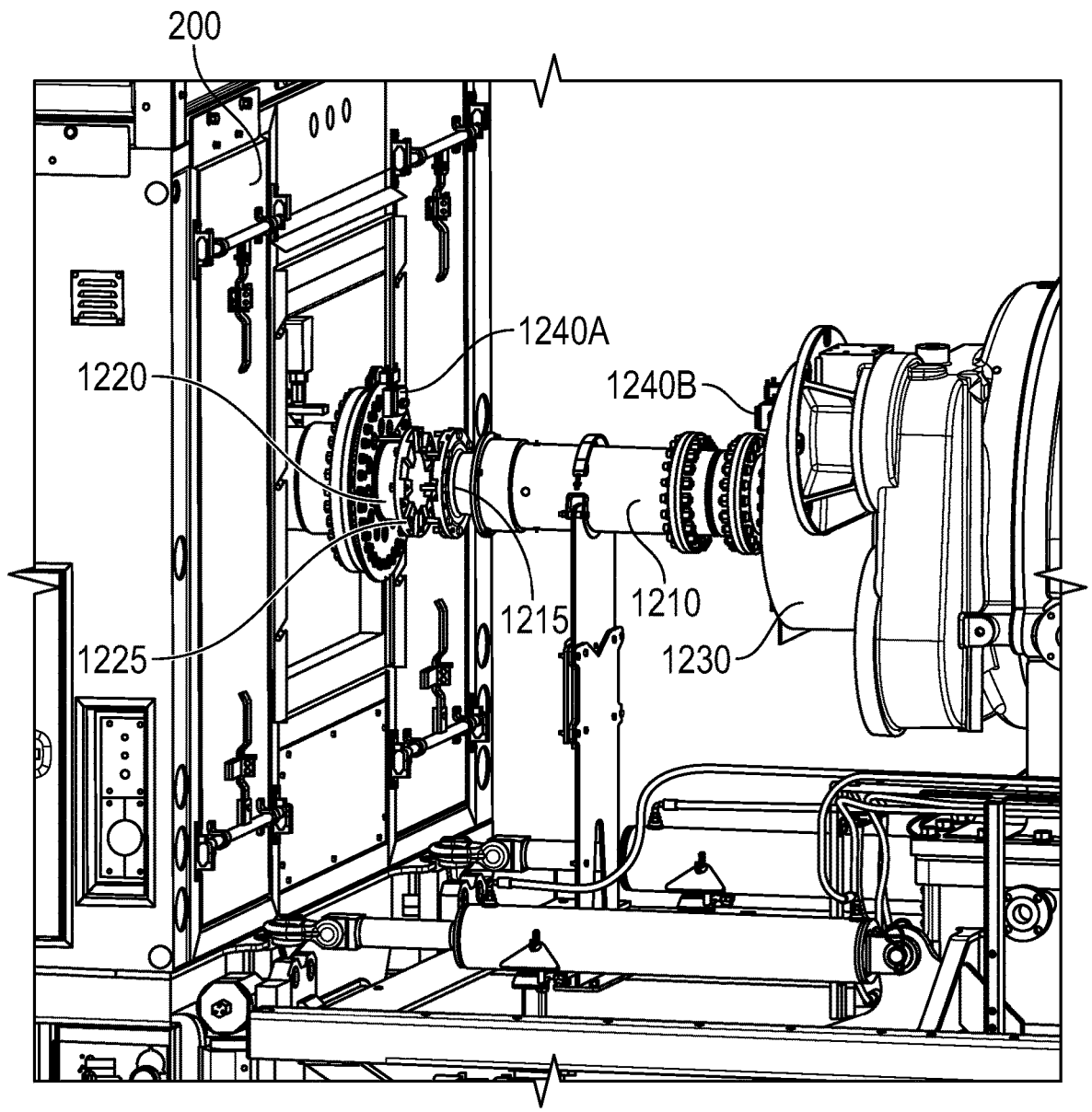
FIGS. 12-14 illustrate the coupling of the driveshaft of a turbine in a turbine trailer and the driveshaft of a generator in a generator trailer, according to an embodiment.
Figure 13:
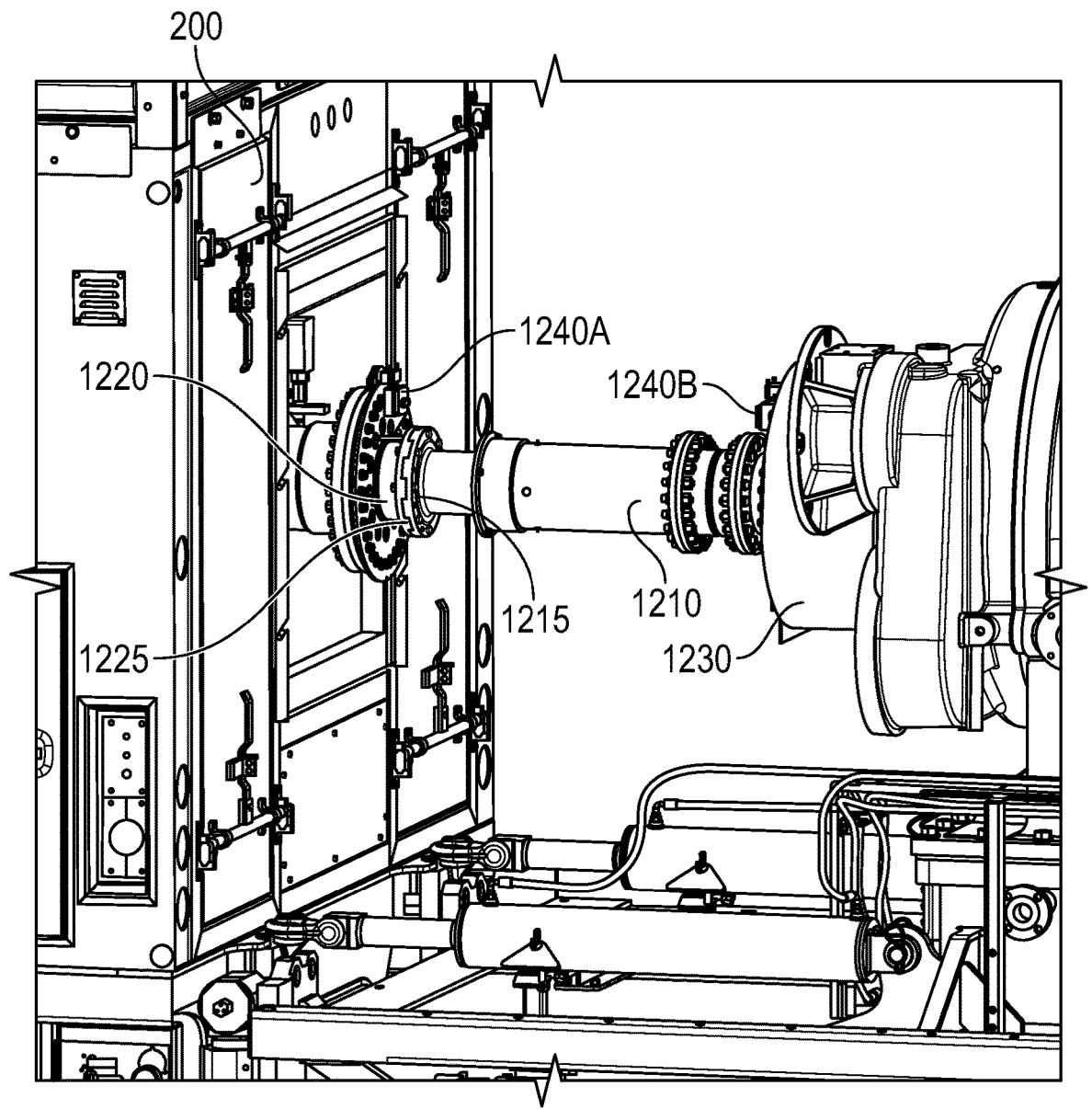
Figure 14:
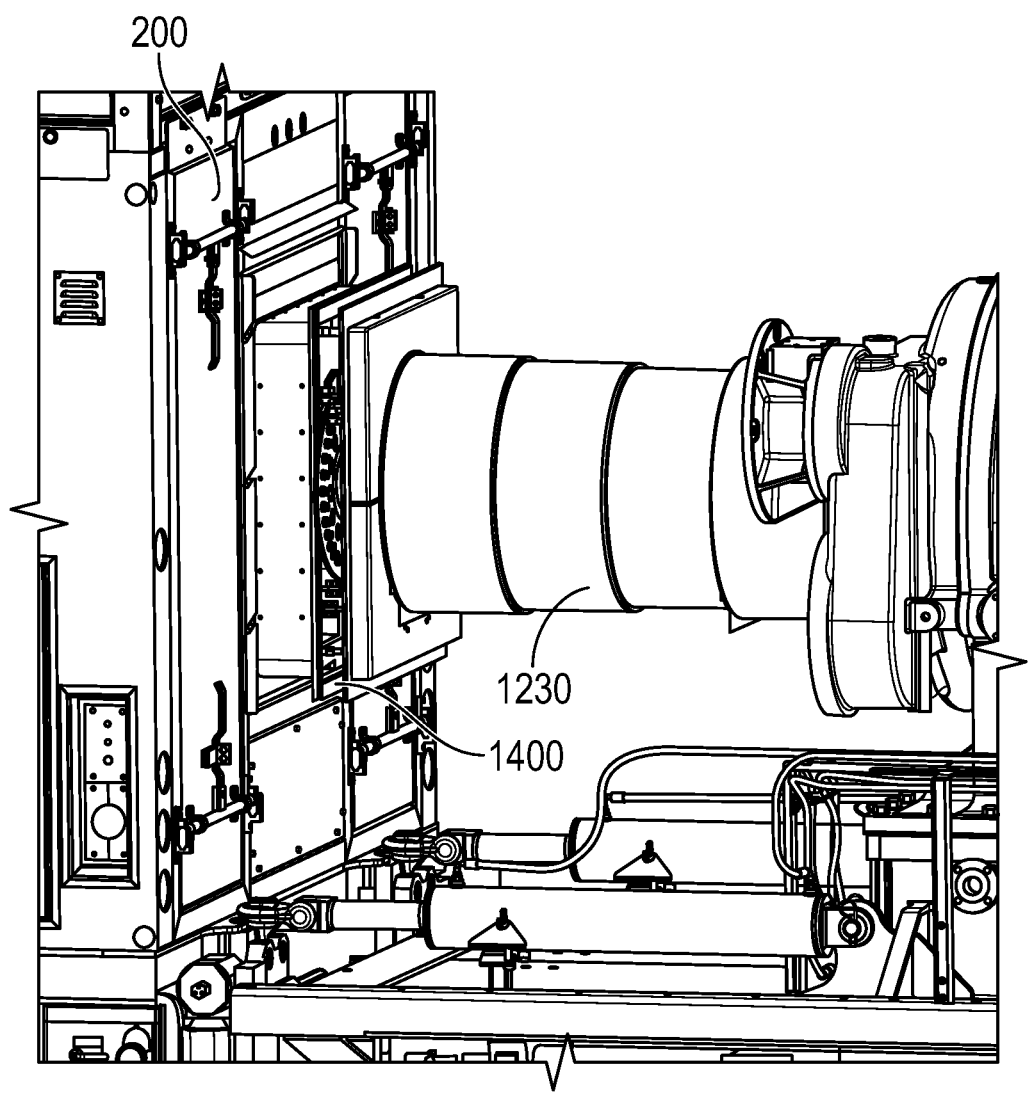

FIGS. 12-14 illustrate the coupling of the driveshaft of the turbine in turbine trailer 100 to the driveshaft of the generator in generator trailer 200, according to an embodiment. For ease of illustration, the enclosure of turbine trailer 100 has been omitted to illustrate driveshaft 1210 of the turbine without obstruction. In practice, driveshaft 1210 may be exposed, for example, by opening door(s), a panel, or other covering on the rear of turbine trailer 100. Similarly, driveshaft 1220 of the generator may be exposed, for example, by opening door(s), a panel, or other covering on the rear of generator trailer 200. Since trailers 100 and 200 have been aligned, driveshafts 1210 and 1220 will also be generally aligned. However, for precise alignment of driveshafts 1210 and 1220, a laser alignment tool 1240 may be used. For example, laser tool 1240 may comprise a laser emitter 1240A and a laser receiver 1240B. Laser emitter 1240A may be attached to the circumference of one of driveshafts 1210 or 1220 (e.g., via magnetic coupling) so as to emit a laser parallel to a longitudinal axis of the one driveshaft 1210 or 1220, and laser receiver 1240B may be attached to a corresponding position on the circumference of the other one of driveshafts 1210 or 1220 (e.g., via magnetic coupling). Measurements may be taken at each of a plurality of positions around the circumferences of driveshafts 1210/1220 to determine an offset, which can then be used to more precisely align driveshafts 1210 and 1220 with each other, for example, using lateral positioners 710 and vertical positioners 720 to shift trailers 100 and 200 relative to each other.

In an embodiment, turbine driveshaft 1210 comprises a telescoping flange 1215 on the exposed end. Similarly, generator driveshaft 1220 comprises a corresponding fixed flange 1225. However, it should be understood that, in an alternative embodiment, generator driveshaft 1220 may comprise the telescoping flange and turbine driveshaft 1210 may comprise the fixed flange, or both turbine driveshaft 1210 and generator driveshaft 1220 could comprise telescoping flanges. As illustrated in FIG. 13, telescoping flange 1215 may be extended to be in flush contact with fixed flange 1225. Telescoping flange 1215 and fixed flange 1225 may then be coupled to each other using any known coupling means (e.g., bolts and nuts along the perimeter of flanges 1215 and 1225 to clamp flanges 1215 and 1225 together).

As illustrated in FIG. 14, a protective cover 1230 may be extended over the coupled driveshafts 1210/1220 to protect driveshafts 1210/1220 from damage by foreign objects and to protect operators from personal injury during operation of the turbomachinery. Protective cover 1230 may be telescoping. In particular, protective cover 1230 may comprise a plurality of segmented cones of decreasing diameters that telescope over their respective lengths to provide a barrier. Protective cover 1230 may be extended from and retracted to the rear of turbine trailer 100, or extended from and retracted to the rear of generator trailer 200. When extended, the end of protective cover 1230 may be coupled to a corresponding flange 1400 or other connection on the rear of the opposing trailer via any coupling means (e.g., secured with clamps). For transportation, protective cover 1230 may be decoupled, collapsed/retracted, and stowed to the turbine gearbox shaft housing (e.g., if provided on turbine trailer 100) or generator shaft housing (e.g., if provided on generator trailer 200). In an alternative embodiment, protective cover 1230 could comprise two telescoping portions, with a first telescoping portion installed on the rear of turbine trailer 100 and a second telescoping portion installed on the rear of generator trailer 200, such that both telescoping portions may be extended and coupled to each other in or near the middle of coupled driveshafts 1210/1220 for operation, and retracted for transportation. In either case, protective cover 1230 seals the enclosures of the two trailers 100 and 200 to each other, thereby protecting the insides of the enclosures against the environment, while allowing driveshafts 1210 and 1220 to be coupled between trailers 100 and 200.

Figure 15:
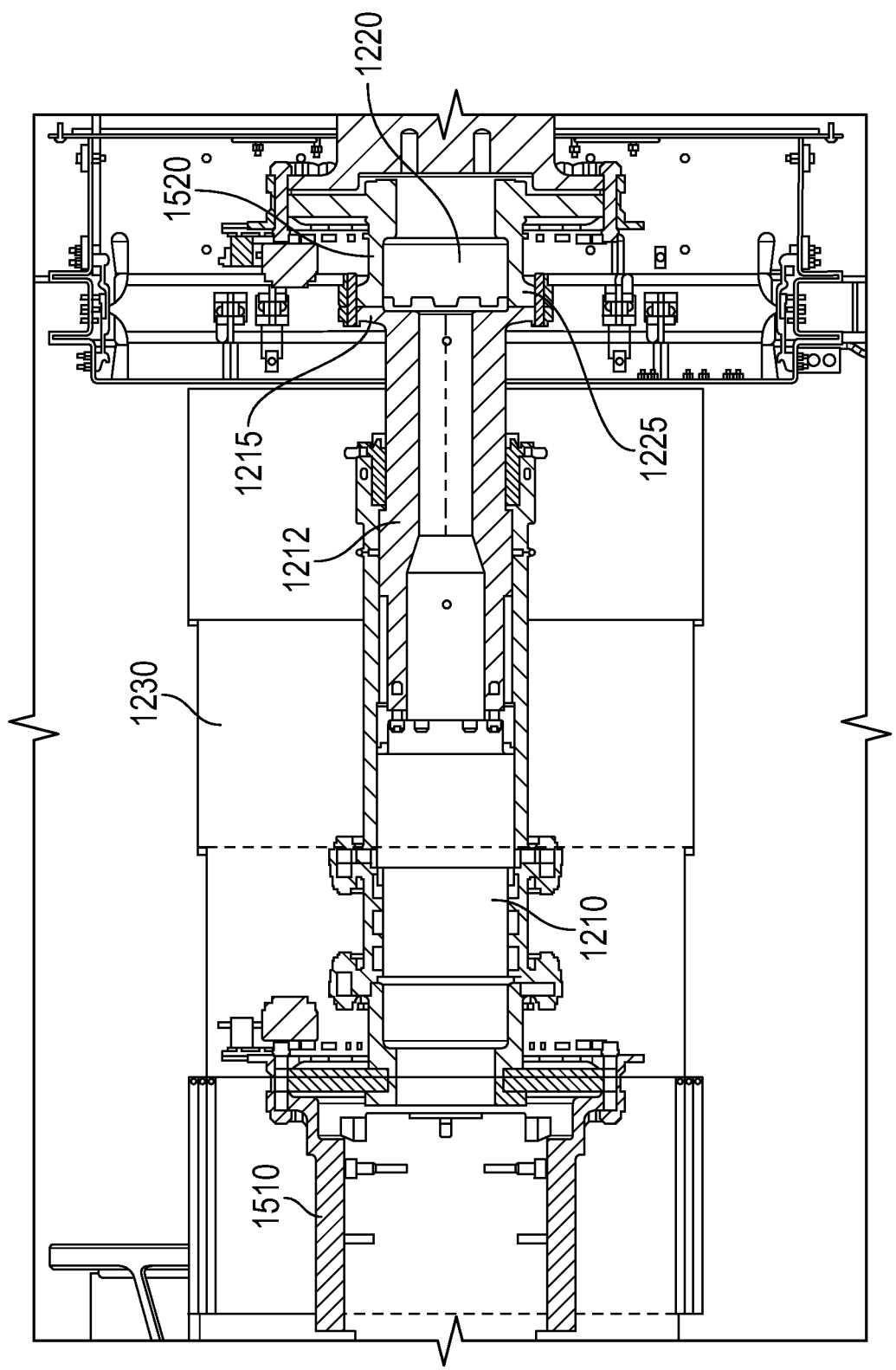
FIG. 15 illustrates a cross-sectional view of driveshafts, sectioned along the longitudinal axis, according to an embodiment.

FIG. 15 illustrates a cross-sectional view of driveshafts 1210/1220, sectioned along the longitudinal axis, according to an embodiment. As illustrated, turbine driveshaft 1210 is coupled to a turbine gearbox shaft hub 1510 in turbine trailer 100, and generator driveshaft 1220 is coupled to a generator shaft hub 1520 in generator trailer 200. In addition, a splined joint 1212 may be utilized to enable the telescoping of telescoping flange 1215, while preventing telescoping flange 1215 from completely exiting driveshaft 1210. During transportation, telescoping flange 1215 may be retracted into driveshaft 1210 and supported with a brace.

Other inter-trailer connections may also be formed via releasable couplings. For example, the drivetrains, electrical systems, fire protection systems, and lube oil systems, between trailers 100 and 200, can all be connected to each other via one or more releasable couplings.

Figure 16:
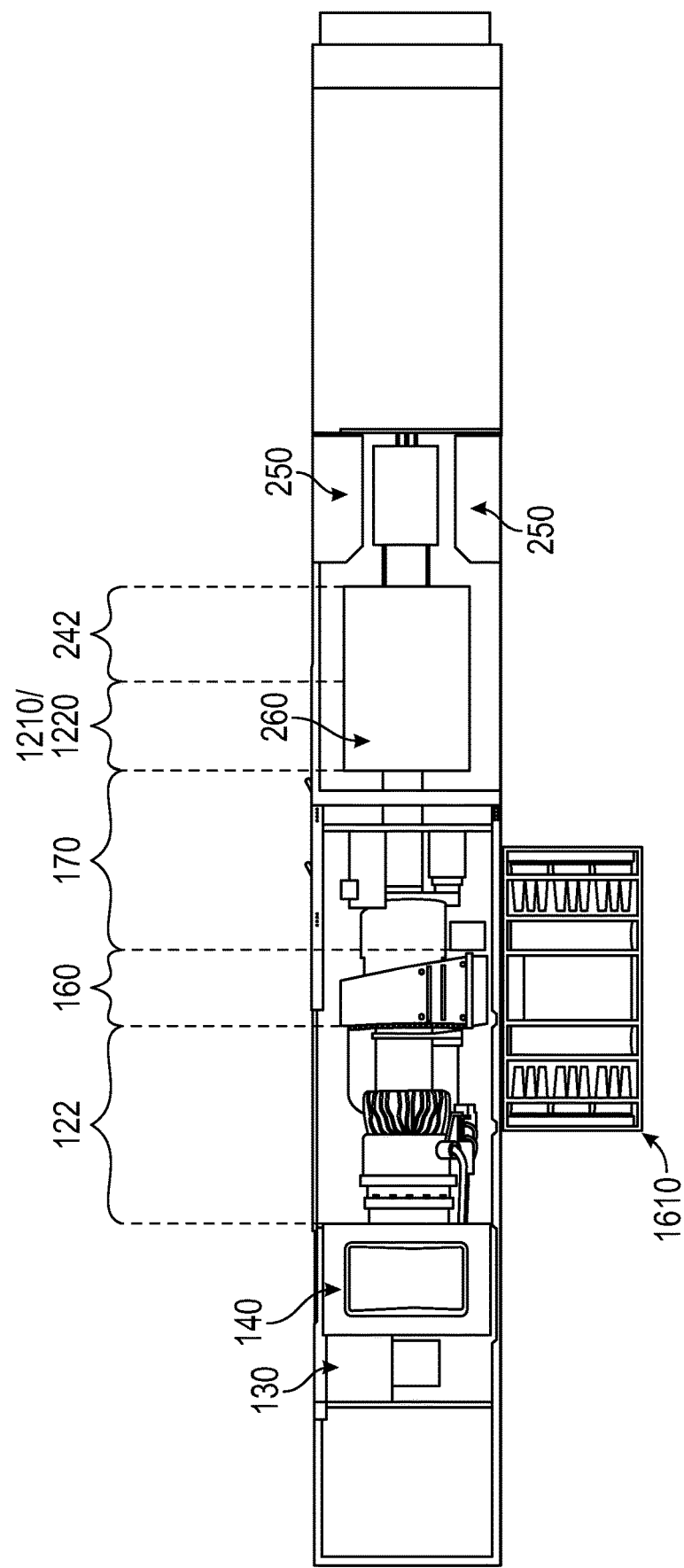
FIG. 16 illustrates a top view of aligned components of an assembled power generation station, according to an embodiment.

FIG. 16 illustrates a top view of the aligned components of the assembled power generation station, according to an embodiment. It should be understood that top panels of the trailers have been omitted in FIG. 16 to illustrate the internal components. In the illustrated embodiment, from the front of turbine trailer 100 to the front of generator trailer 200, the aligned components comprise turbine enclosure vent fan(s) 130 (e.g., for venting exhaust from the interior of turbine trailer 100), turbine exhaust 140 (e.g., for venting exhaust produced by turbine 122), turbine 122, turbine air inlet 160 (e.g., for providing air into turbine 122), turbine enclosure vent inlet 170 (e.g., for providing cooling air into the interior of turbine trailer 100), generator exhaust 260, generator 242, and generator compartment vent inlet 250. Notably, all inlet and exhaust systems are contained within the enclosures of trailers 100 and 200. While alternative embodiments may implement different arrangements or layouts of components, the disclosed arrangement has been found to facilitate cooling flows and gas dissipation in enclosure ventilation, distribute weight in accordance with frame structural analysis and road regulations, minimize pressure losses in filtration, provide ergonomics for inspection and maintenance, utilize space efficiently, and the like.

Not all components of the power generation station need to fit within the enclosures of trailers 100 and 200. For example, a turbine air inlet filtration module 1610 may be connected externally to turbine trailer 100, at a position that is logically before the intake of turbine air inlet 160, to filter the air flowing into turbine 122. Turbine air inlet filtration module 1610 may be cantilevered from the bottom edge of turbine trailer 100 and/or supported by hydraulic jacks (e.g., similar to hydraulic jacks 102). Turbine air inlet filtration module 1610 may be coupled and decoupled from turbine air inlet 160 using any known coupling means, and may be transported separately from trailers 100 and 200.

In an embodiment, the ventilation within turbine compartment 120 is based on a "pull" system that takes in fresh air from filtered inlet ducts (e.g., turbine enclosure vent inlet 170), mounted on the enclosure wall of the compressor end of turbine 122. This air is then evacuated from exhaust fans (e.g., turbine enclosure vent fan(s) 130), mounted on the combustion end of turbine 122, which creates negative pressure within turbine compartment 120. This is ideal for protection from gas leaks. The disclosed layout of turbine trailer 100 is ideal for maximizing space and providing the cooling flow that supports turbine 122.

In an embodiment, the ventilation within generator compartment 240 is based on a "push" system that forces air from filtered inlet ducts (e.g., vent inlet 250), mounted on the enclosure wall of the exciter end of generator 242. The air may be forced into generator compartment 240 using inlet fans to positively pressurize generator compartment 240. This is ideal for protection from gas intrusion from adjacent turbine compartment 120. Generator 242 may itself have open cooling ports, which take in fresh air from generator compartment 240, to cool generator 242. Generator 242 may exhaust air through the roof of generator compartment 240 (e.g., via generator exhaust 260). The disclosed layout of generator trailer 200 is ideal for maximizing space and providing the cooling flow that supports generator 242.

In an embodiment, trailers 100 and/or 200 may have provisions (e.g., support and attachment components) that enable the respective trailer to be lifted via crane and/or lashed down to a foundation. The power generation station may be capable of running on gas and/or liquid fuel. In an embodiment, a separate liquid fuel module may be coupled to trailer 100 and/or 200 to provide liquid fuel to the power generation system.

Figure 17:
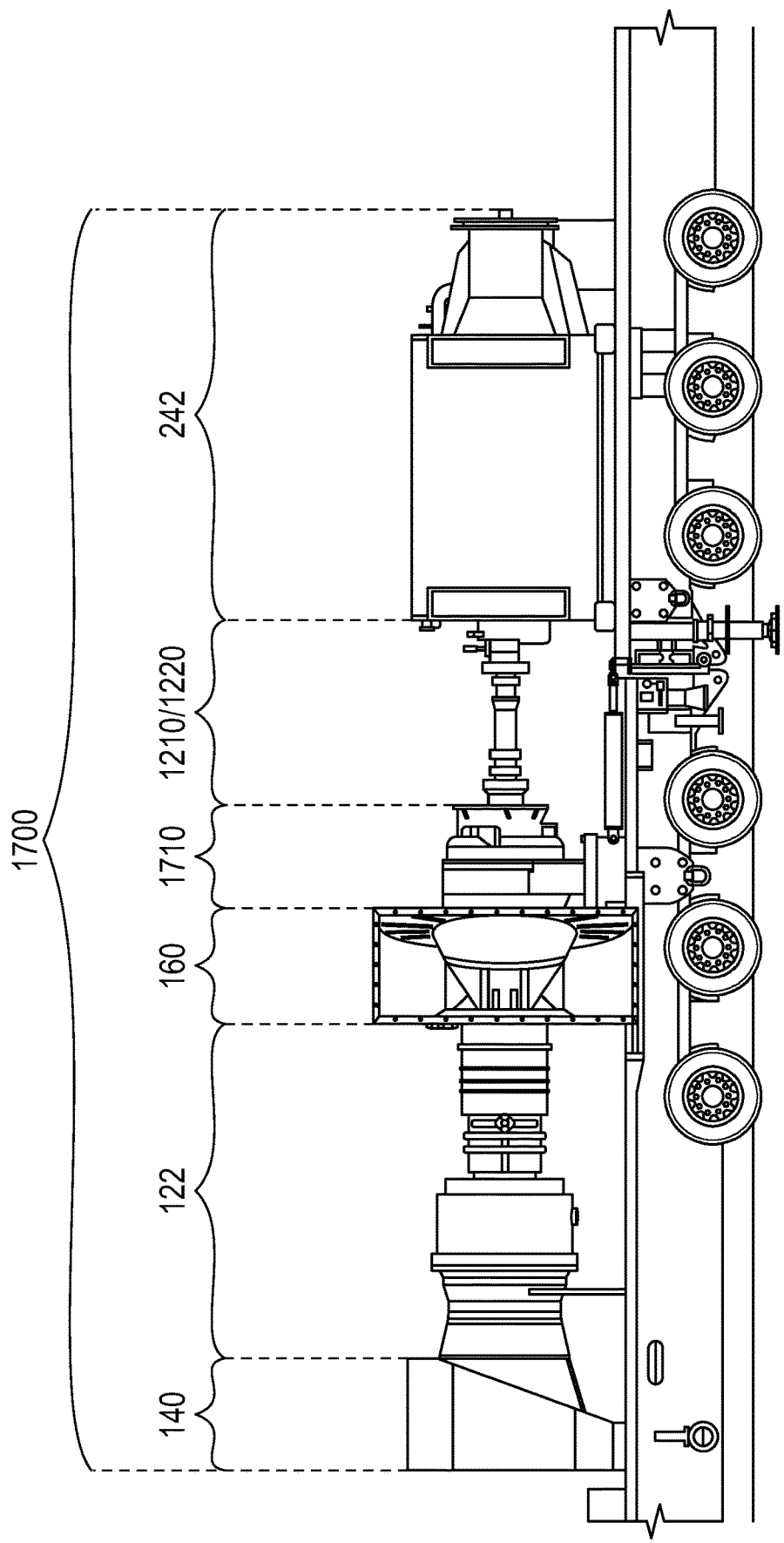
FIG. 17 illustrates a complete turbomachine power generation station, according to an embodiment.

FIG. 17 illustrates a complete turbomachine power generation station 1700, according to an embodiment. As illustrated, the complete turbomachine power generation station 1700 comprises, from one end to the opposite end, turbine exhaust 140, turbine 122, turbine air inlet 160, an integrated reduction gearbox 1710 that is directly attached to driveshaft 1210, which is driven by turbine 122 and which is coupled to driveshaft 1220, which drives generator 242. In general, air will flow into turbine air inlet 160 and through turbine 122, where it will be compressed, mixed with fuel, and combusted to drive the rotation of rotor assemblies within turbine 122. In turn, the rotation of the rotor assemblies rotates a rotor shaft within turbine 122 that rotates coupled driveshaft 1210/1220 via integrated reduction gearbox 1710. The rotation of coupled driveshaft 1210/1220 drives generator 242. Integrated reduction gearbox 1710 reduces the speed of rotation from the internal driveshaft of turbine 122 to driveshafts 1210/1220. The exhaust from the combustion in turbine 122 exits the other side of turbine 122 through turbine exhaust 140.

Figure 18:
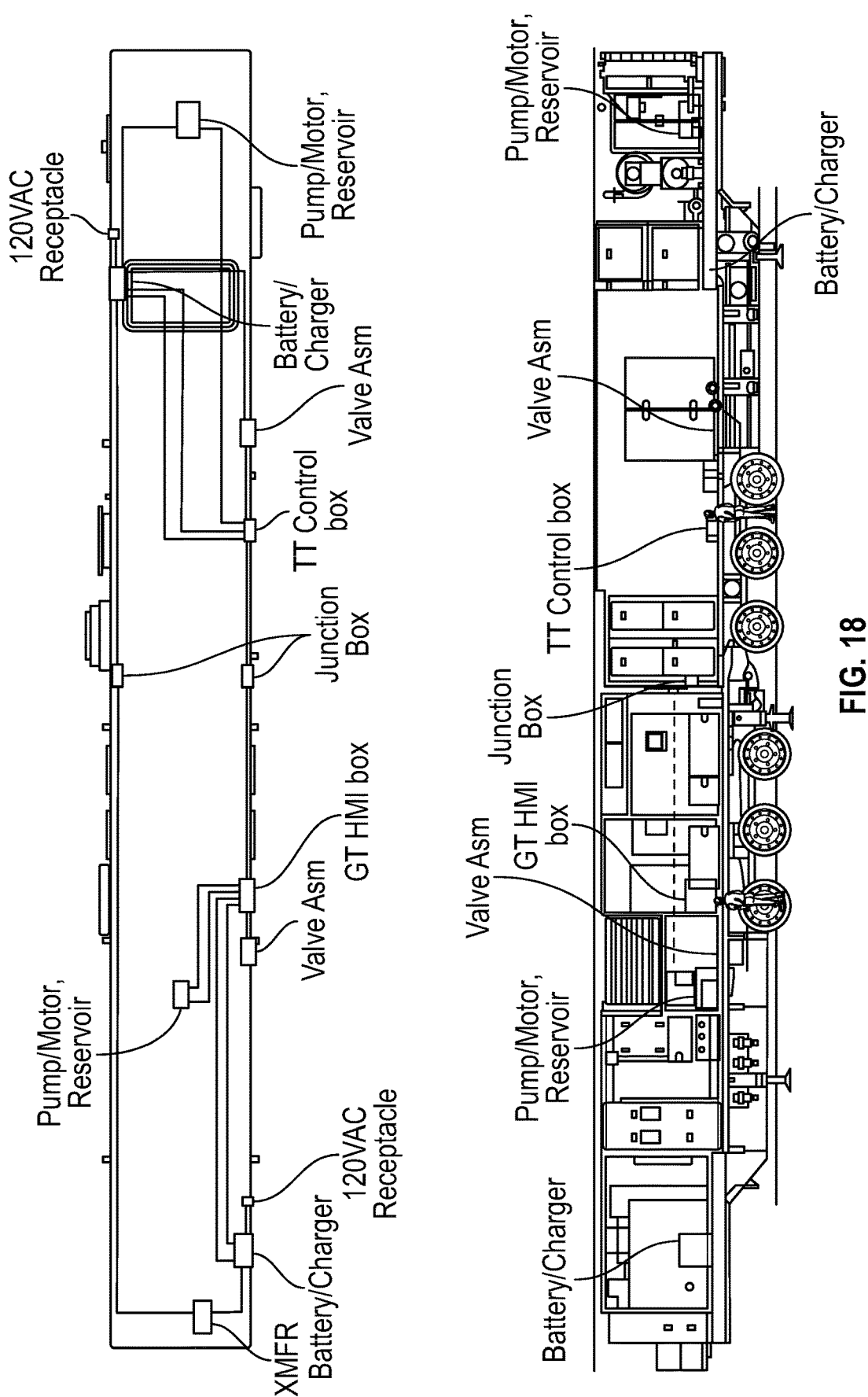
FIG. 18 illustrates the components of hydraulic and control systems of a pair of trailers, according to an embodiment.

FIG. 18 illustrates the components of the hydraulic system and control systems of trailers 100 and 200, according to an embodiment. For example, the illustrated components may implement the automated leveling, using inclinometers 1110 and hydraulic jacks 102/202, described elsewhere herein. Notably, the systems that control hydraulic jacks 102/202 and the turbomachinery are positioned (e.g., on the sides of trailers 100 and 200) to ensure that the alignment and coupling systems are accessible to operators and to optimize electrical cable runs for each component.

Figure 19:
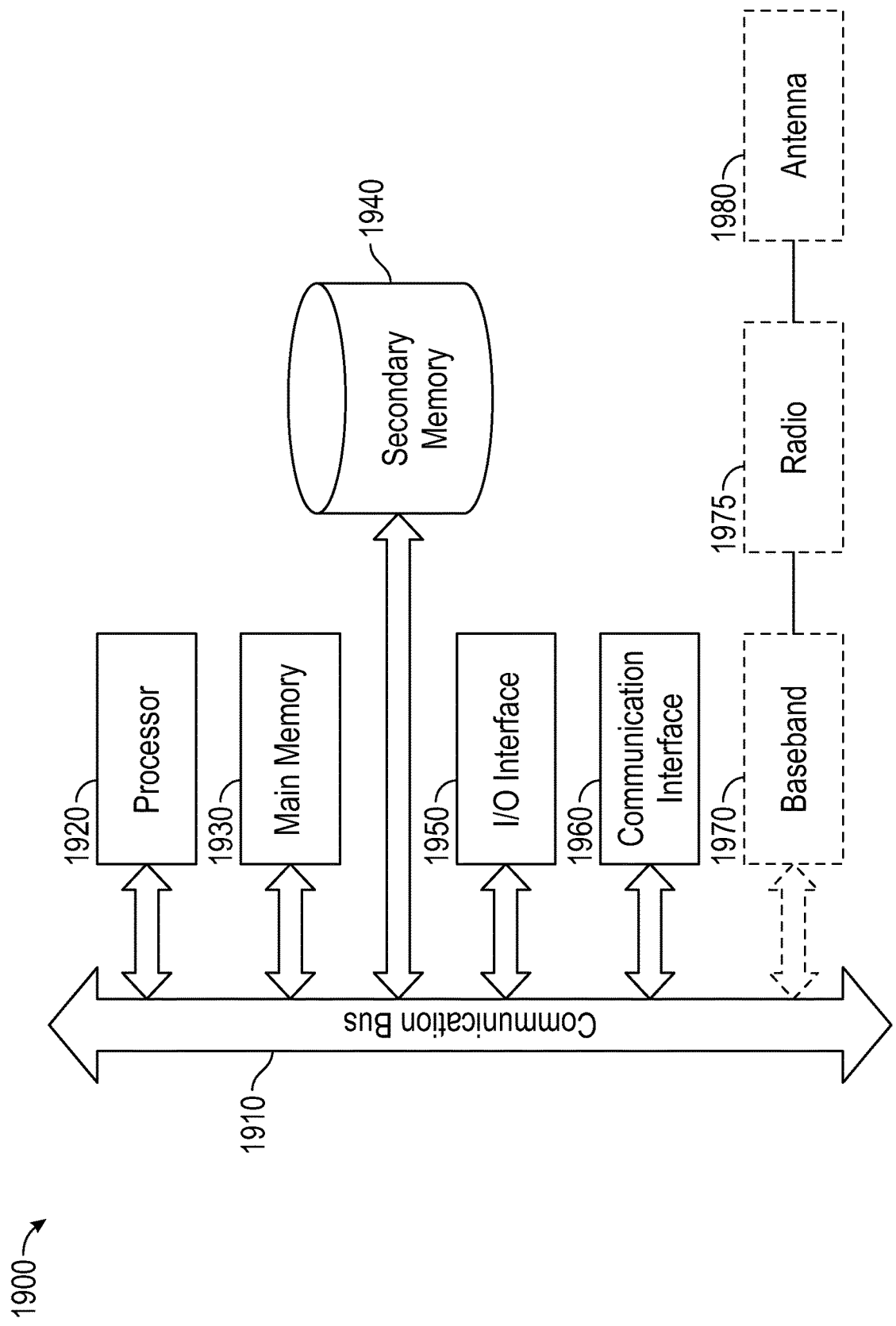
FIG. 19 illustrates an example architecture for a control system, according to an embodiment.

It should be understood that the control systems disclosed herein may utilize any standard or non-standard computer architectures. FIG. 19 illustrates one example architecture for a control system 1900, according to an embodiment. In an embodiment, the control system(s) 1900 comprise one or more processors 1920 (e.g., central processing units (CPUs), special-purpose microprocessors, etc.) that are communicatively connected, via a communication bus 1910 or other data channel, to main memory 1930 (e.g., any form of random access memory (RAM)) and/or secondary memory 1940 (e.g., a non-transitory computer-readable medium, such as a hard disk drive, solid state drive, etc.). Software instructions (e.g., representing computer programs, disclosed algorithms, etc.) may be transferred from secondary memory 1940 to main memory 1930, and processor(s) 1920 may execute the software instructions from main memory 1930. In addition, processor(s) 1920 may be communicatively connected to one or more external systems via an input/output interface 1950 (e.g., physical port) and/or communication interface 1950 (e.g., network interface card) to receive and send data to the external system(s). For example, processor(s) 1920 may receive data from a first external system (e.g., sensors, such as inclinometers 1110), process the data according to the executed software instructions, and control a second external system (e.g., hydraulic jacks 102/202) based on the data according to the executed software instructions. In some cases, a control system 1900 may be configured to communicate wirelessly via an antenna 1980 under the management of a radio system 1975, with signals encoded and decoded by a baseband system 1970.

Figure 20:
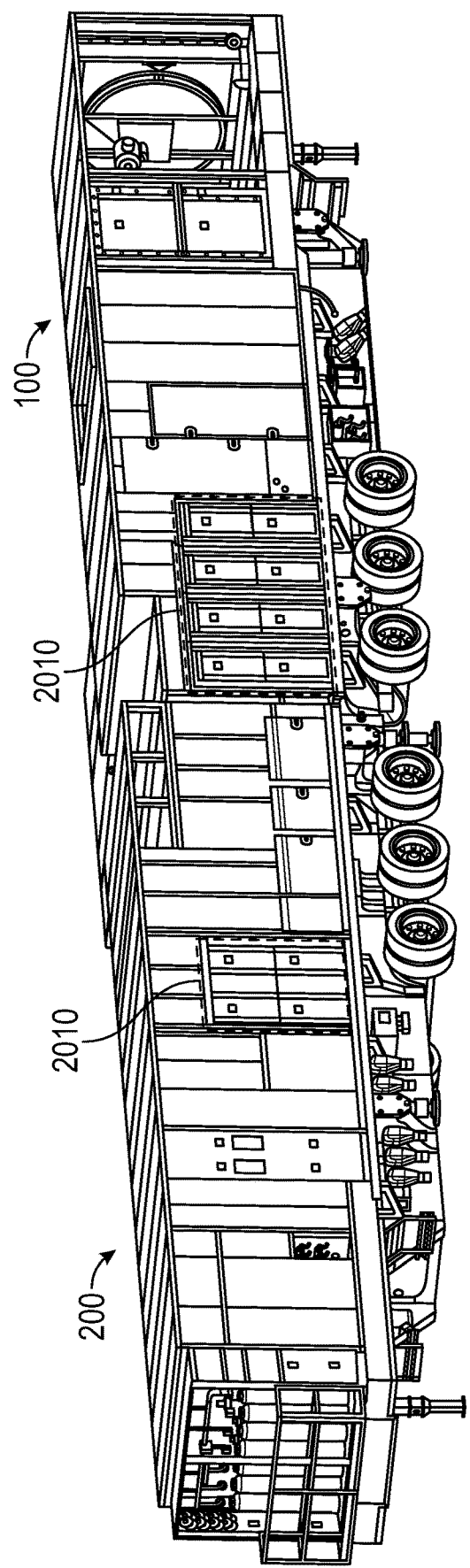
FIG. 20 illustrates a top perspective view of a coupled pair of trailers, according to an embodiment.

FIG. 20 illustrates a top perspective view of coupled trailers 100 and 200, according to an embodiment. As illustrated, ventilation inlet filters 2010 (e.g., for turbine enclosure vent inlet 170 and generator enclosure vent inlet 250) may be incorporated into the sides of trailers 100 and 200. In an embodiment, ventilation inlet filters 2010 may be incorporated or integrated into doors or removable panels on the sides of trailers 100 and 200. In such an embodiment, the doors or panels, including the integrated ventilation inlet filters 2010, may be opened or removed to provide access to the interiors of trailers 100 and 200 and/or to facilitate replacement of ventilation inlet filters 2010.

Figure 21:
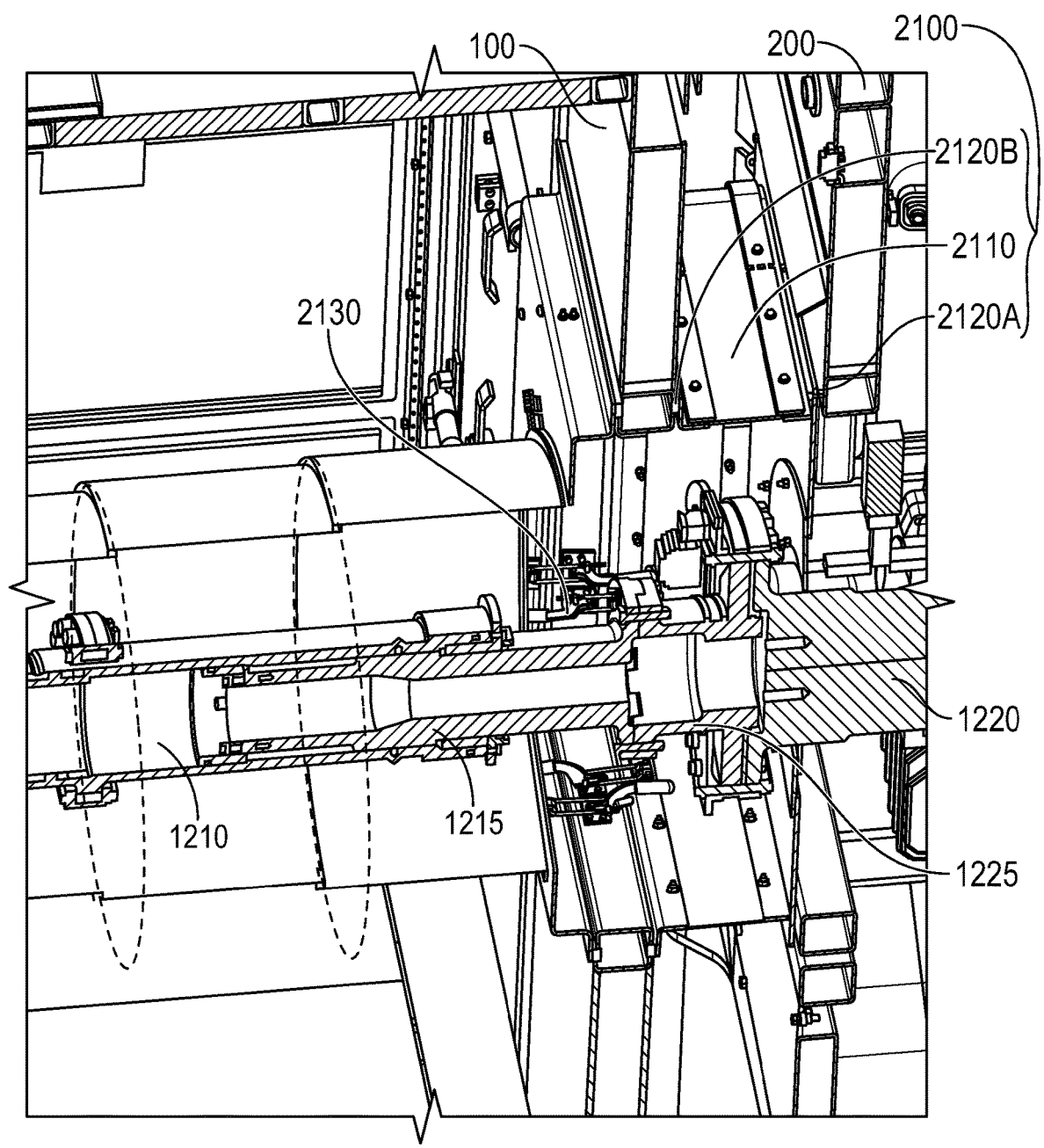
FIGS. 21 and 22 illustrate an inter-trailer seal between a coupled pair of trailers, according to an embodiment.
Figure 22:
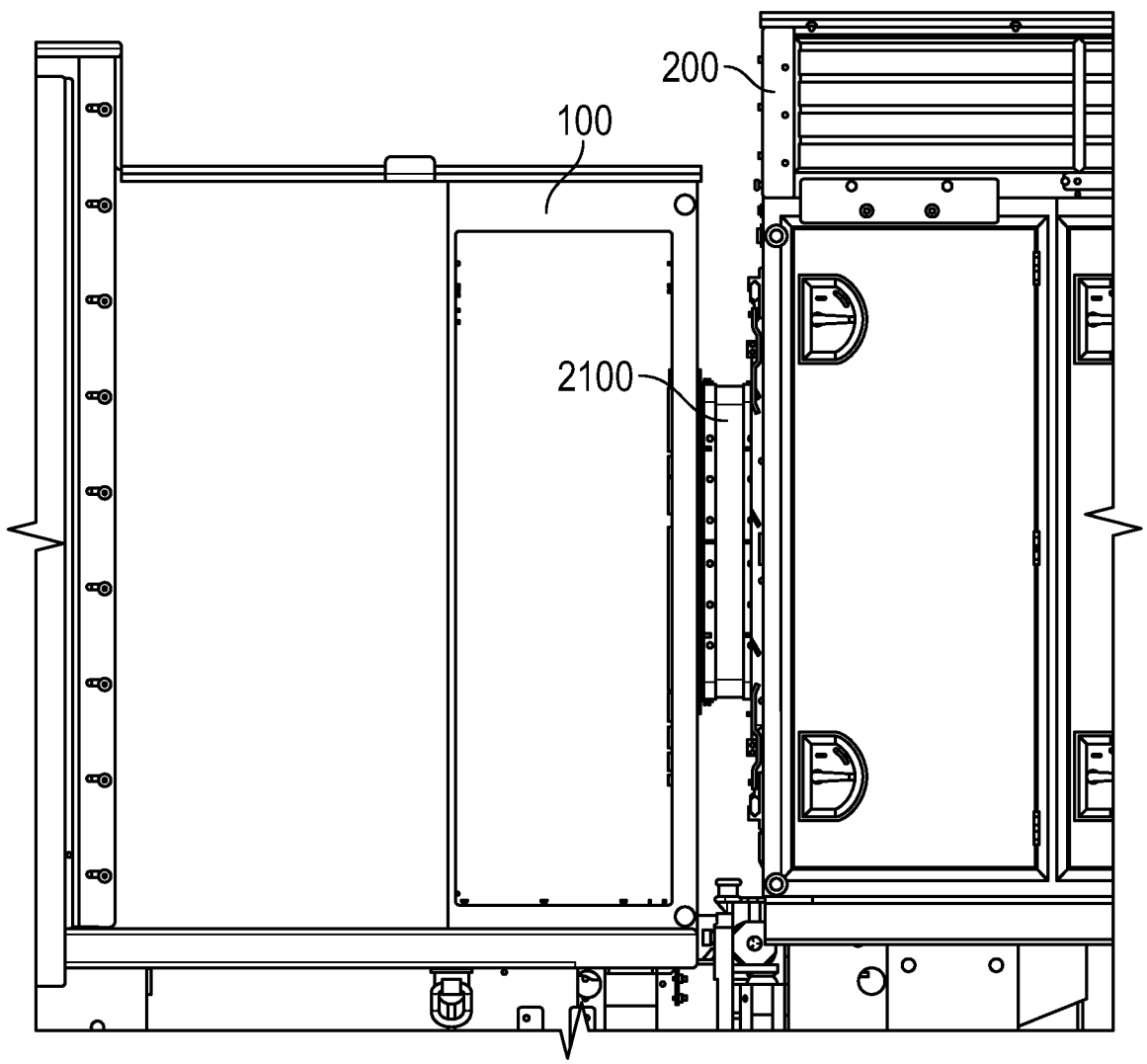

FIGS. 21 and 22 illustrate an inter-trailer seal 2100 between coupled trailers 100 and 200, according to an embodiment. As illustrated, inter-trailer seal 2100 may comprise an extendable and retractable cover 2110 with a first sealing flange 2120A on one end and a second sealing flange 2120B on the other end. In addition, inter-trailer seal 2100 may comprise a plurality of fastening means 2130 (e.g., clamps) to fix sealing flanges 2120 to their respective trailers. During transportation, inter-trailer seal 2100 may be stowed by retracting cover 2110 towards one trailer (e.g., generator trailer 200) to collapse second sealing flange 2120B towards first sealing flange 2120A. Cover 2110 may be releasably fixed in the retracted position (e.g., using fastening means 2130). After coupling of trailers 100 and 200 and prior to operation of the turbomachine, inter-trail seal 2100 may be extended between the two trailers 100 and 200, and sealing flanges 2120 may be fixed to their respective trailers using fastening means 2130 to thereby seal the area around the coupled driveshafts 1210/1220 of the turbomachine. It should be understood that inter-trailer seal 2100 may be used in addition to protective cover 1230, and may interface with protective cover 1230 to provide additional protection to components within protective cover 1230 as well as to protect components that may exist between protective cover 1230 and inter-trailer seal 2100.

Figure 23:
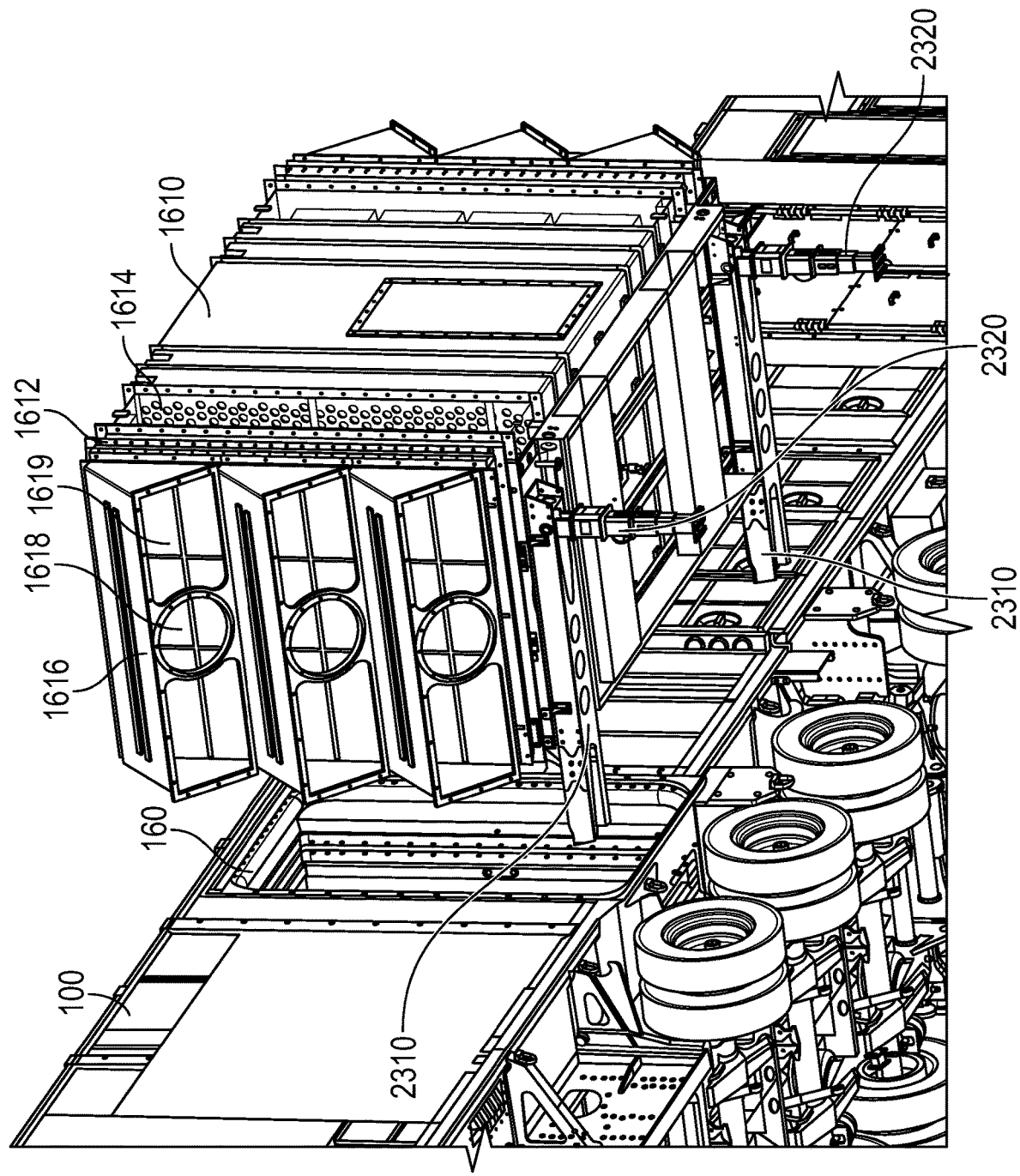
FIGS. 23 and 24 illustrate bottom perspective views of a turbine air inlet filtration module, unattached and attached to a trailer, respectively, according to an embodiment.
Figure 24:
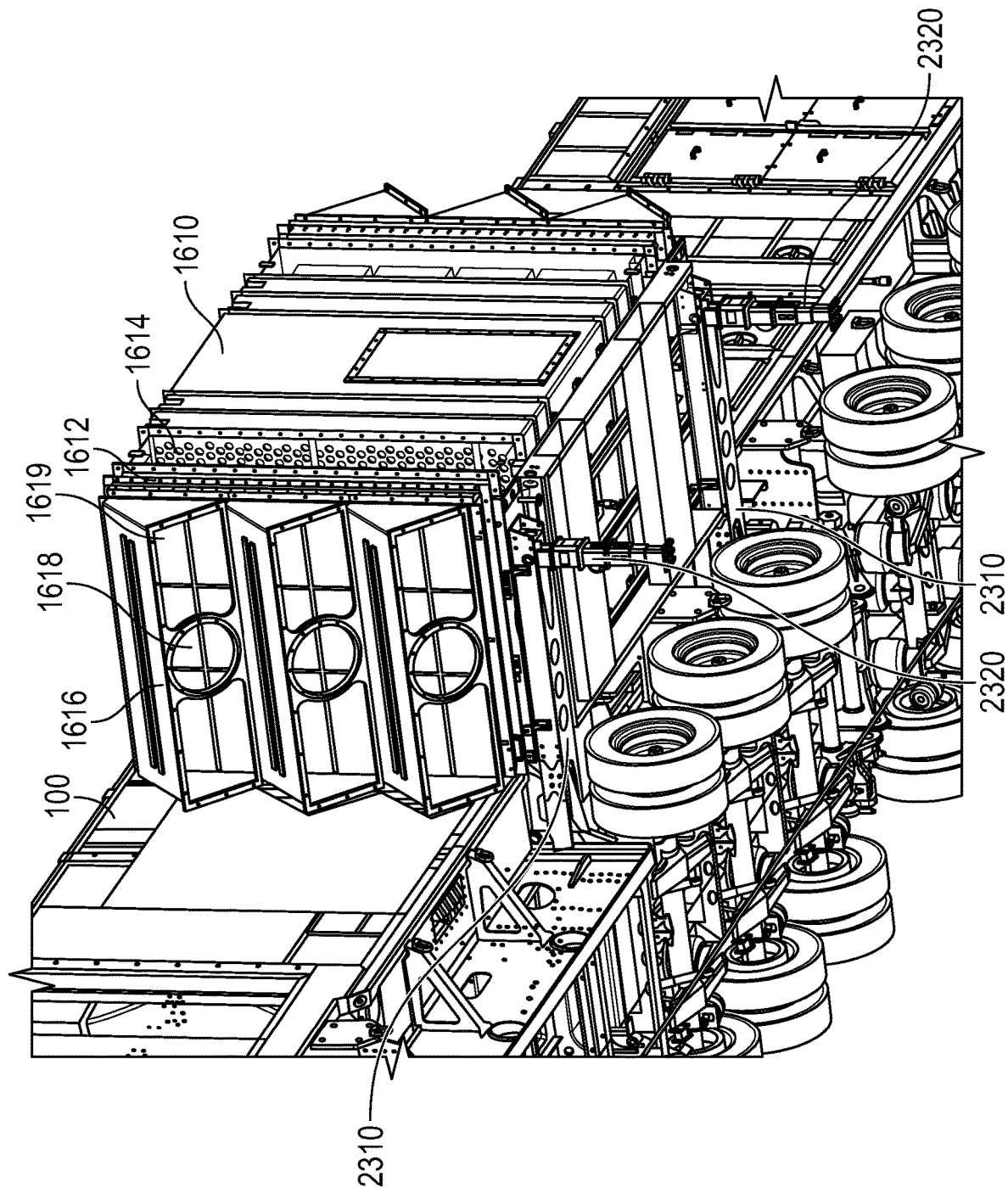

FIGS. 23 and 24 illustrate bottom perspective views of turbine air inlet filtration module 1610, unattached and attached to trailer 100, respectively, according to an embodiment. As illustrated, the intake of turbine air inlet 160 may be through the side of turbine trailer 100, and turbine air inlet filtration module 1610 may be logically positioned before the intake to form one or a plurality of flow paths from an external environment of air inlet filtration module 1610 to the intake of turbine air inlet 160. Turbine air inlet filtration module 1610 may comprise an enclosure with one or a plurality of stages of air filters 1612 (e.g., two-stage air particle filtration) and an acoustic silencer 1614, along the flow path(s), to provide air filtration and noise reduction, respectively, to turbine air inlet 160. In addition, turbine air inlet filtration module may comprise weather hoods 1616 on both ends to prevent ingress of rain and/or snow. Weather hoods 1616 may comprise round ducting ports 1618 for provision of heating to air filters 1612, to prevent icing during rain and snow, and mist separators/eliminators 1619. As illustrated, turbine air inlet filtration module 1610 may be cantilevered to the side of turbine trailer 100 using beams 2310 that are releasably fixed to the bottom of turbine trailer 100 and the bottom of turbine air inlet filtration module 1610. In addition, turbine air inlet filtration module 1610 may be supported by legs 2320. During transport, beams 2310 may be detached from turbine trailer 100 and slid out of the way (e.g., into corresponding recesses in the bottom of turbine air inlet filtration module 1610) or removed entirely, and legs 2320 may be folded (e.g., vertically against the side of turbine air inlet filtration module 1610) and stowed out of the way.

Figure 25:
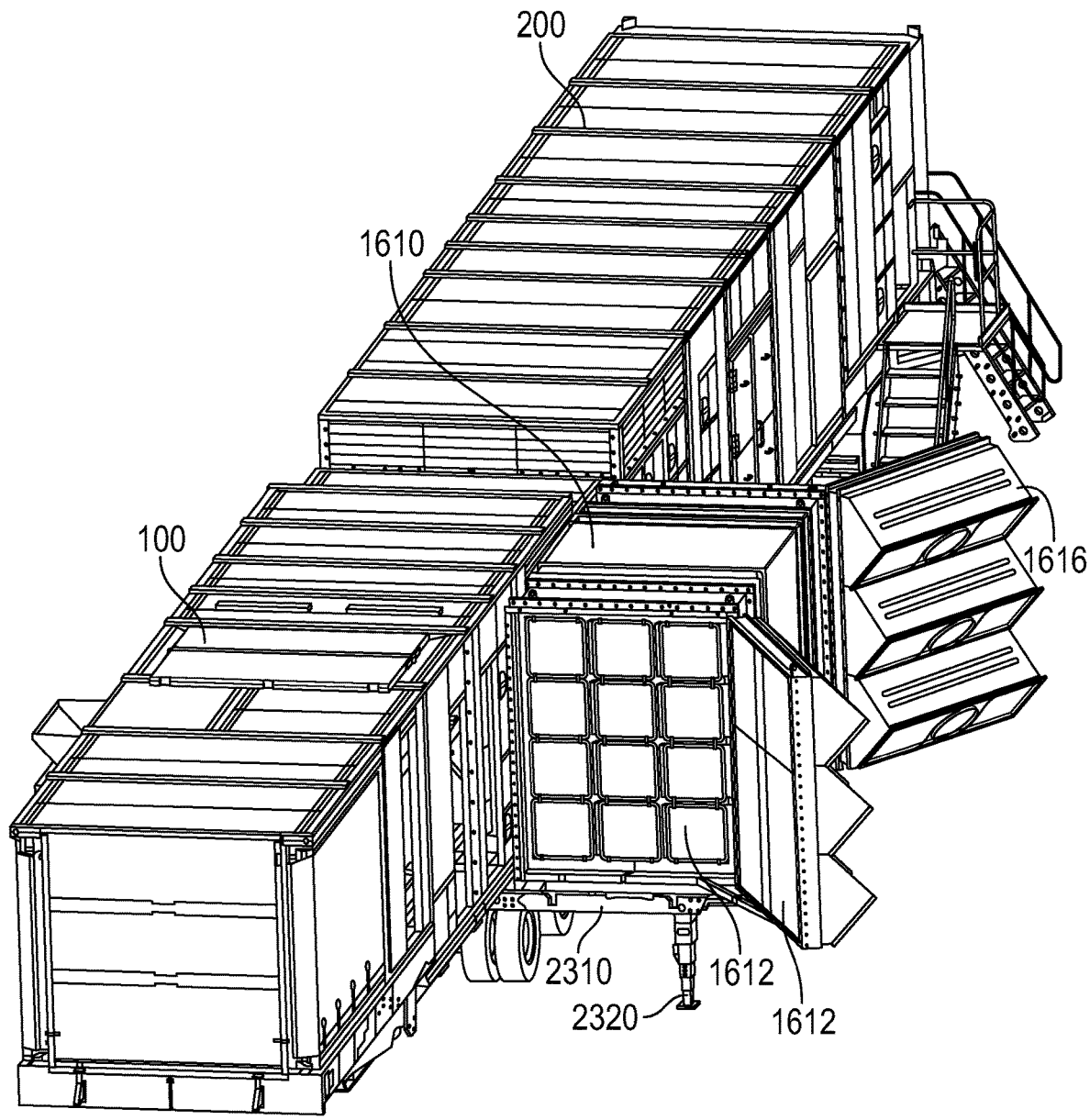
FIG. 25 illustrates a top perspective view of a turbine air inlet filtration module, according to an embodiment.

FIG. 25 illustrates a top perspective view of turbine air inlet filtration module 1610, attached to trailer 100, according to an embodiment. As illustrated, both ends of air inlet filtration module 1610 may open to expose the two-stages of air filters 1612. For example, both ends of air inlet filtration module 1610 may comprise doors that open and close via a hinge and arm. The doors on both ends of air inlet filtration module 1610 may swing outwards away from trailer 100, to prevent obstruction to the side of trailer 100 (e.g., which may comprise various access panels), as well as to accommodate weather hoods 1616. Each door may itself comprise one stage of air filters 1612, while a second stage of air filters 1612 is exposed in the open end of air inlet filtration module 1610. Thus, both stages of air filters 1612 may be easily accessed and/or replaced as needed.

Figure 26:
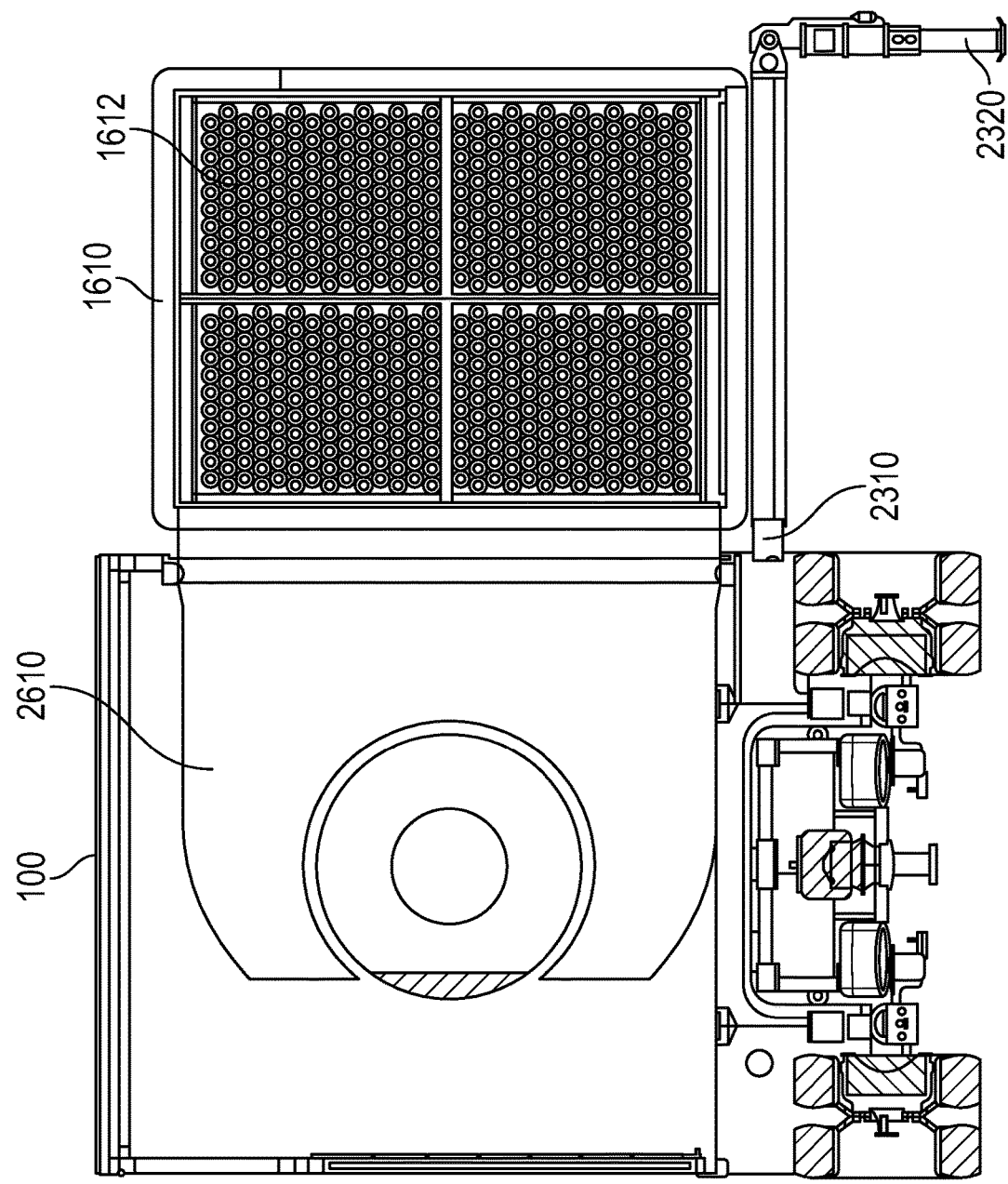
FIG. 26 illustrates a cross-sectional view of a trailer coupled to a turbine air inlet filtration module, according to an embodiment.

FIG. 26 illustrates a cross-sectional view of turbine trailer 100 coupled to turbine air inlet filtration module 1610, according to an embodiment. As illustrated, an inflatable seal 2610 may be used to seal the ventilation space (e.g., flow path(s)), so that turbine air inlet filtration module 1610 does not necessarily need to be bolted to turbine trailer 100.

INDUSTRIAL APPLICABILITY

Disclosed embodiments separate the turbine 122 and generator 242 of a power generation station 1700 into two separate trailers 100 and 200, respectively, that comply with automotive road regulations. Thus, the power generation station may be mobilized and transported to any road-accessible location at which it is needed. In addition, the disclosed embodiments comprise various alignment systems that facilitate coarse and fine alignment and leveling of turbine 122 and generator 242, as well as coupling systems that facilitate secure and protected coupling of turbine 122 and generator 242 for operation of power generation station 1700 at the desired location. It should be understood that decoupling of trailers 100 and 200 may comprise the same set of operations as was used for coupling trailers 100 and 200, but in reverse order.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of turbomachine. Hence, although the present embodiments are, for convenience of explanation, depicted and described as being implemented in a gas turbine engine, it will be appreciated that it can be implemented in various other types of turbine engines and machines with turbines or mechanical drivetrains which would benefit from uncoupling for transportation, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A power generation station comprising:
   a driveshaft separated into a first portion and a second portion;
   a turbine trailer comprising a turbine compartment housing a turbine, wherein the turbine drives the first portion of the driveshaft;
   a generator trailer comprising a generator compartment housing a generator, wherein the generator is driven by the second portion of the driveshaft;
   a first rear interface of one of the turbine trailer and the generator trailer; and
   a second rear interface of the other one of the turbine trailer and the generator trailer, wherein the second portion of the driveshaft is configured to couple and decouple with the first portion of the driveshaft,
   wherein one of the first rear interface and the second rear interface comprises one or more hydraulic cylinders with a first fastening portion,
   wherein the other one of the first rear interface and the second rear interface comprises a second fastening portion that corresponds to the first fastening portion of each of the one or more hydraulic cylinders,
   wherein each first fastening portion is configured to engage with a corresponding second fastening portion, and
   wherein each of the one or more hydraulic cylinders is configured to, when the respective first fastening portion is engaged with the corresponding second fastening portion, pull the other one of the first rear interface and the second rear interface towards the one of the first rear interface and the second rear interface.

2. The power generation station of claim 1, wherein the first rear interface comprises at least two guide pins, and wherein the second rear interface comprises at least two receiving sockets, wherein each of the at least two receiving sockets is configured to receive one of the two guide pins.

3. The power generation station of claim 2, wherein one of the first and second rear interfaces comprises at least two lateral positioners configured to, when the two guide pins are received within the two receiving sockets, adjust a lateral alignment between the turbine trailer and the generator trailer.

4. The power generation station of claim 3, wherein the other one of the first and second rear interfaces comprises at least four vertical positioners configured to, when the two guide pins are received within the two receiving sockets, adjust a vertical alignment between the turbine trailer and the generator trailer.

5. The power generation station of claim 4, wherein each lateral positioner and each vertical positioner comprises a jacking bolt.

6. The power generation station of claim 5, wherein each jacking bolt comprises a bolt, kinematic ball, and a ball socket between the bolt and the kinematic ball.

7. The power generation station of claim 2, wherein one of the first and second rear interfaces comprises at least four vertical positioners configured to, when the two guide pins are received within the two receiving sockets, adjust a vertical alignment between the turbine trailer and the generator trailer.

8. The power generation station of claim 7, wherein each vertical positioner comprises a jacking bolt.

9. The power generation station of claim 8, wherein each jacking bolt comprises a bolt, kinematic ball, and a ball socket between the bolt and the kinematic ball.

10. The power generation station of claim 1, wherein each of the turbine trailer and the generator trailer comprises a plurality of inclinometers configured to generate an output signal indicating an inclination of the respective trailer, and a plurality of hydraulic jacks, and wherein the power generation station further comprises a control system that is configured to:
  receive the output signals from each of the plurality of inclinometers of the turbine trailer and the generator trailer; and
  automatically adjust one or more of the plurality of hydraulic jacks until the output signals from each of the plurality of inclinometers of the turbine trailer and the generator trailer match stored values representing an alignment between drivetrains of the turbine trailer and the generator trailer.

11. The power generation station of claim 1, wherein one or both of the first portion and the second portion of the driveshaft comprises a telescoping flange.

12. The power generation station of claim 1, wherein one or both of the turbine trailer and the generator trailer comprises a telescoping protective cover configured to extend around the driveshaft while the first portion and the second portion of the driveshaft are coupled to each other.

13. The power generation station of claim 1, wherein a first rear interface of one of the turbine trailer and the generator trailer comprises a laser emitter that emits a laser parallel to a longitudinal axis of the respective first portion or second portion of the driveshaft, and wherein a second rear interface of the other one of the turbine trailer and the generator trailer comprises a laser receiver configured to detect the laser and output a measure of alignment between the first portion and the second portion of the driveshaft.

14. The power generation station of claim 1, wherein the turbine comprises a rotor shaft that rotates the first portion of the driveshaft via an integrated reduction gearbox that is configured to reduce the speed of rotation of the first portion of the driveshaft relative to the rotor shaft.

15. The power generation station of claim 1, wherein the turbine compartment further houses a turbine air inlet that supplies air to the turbine, wherein the power generation station further comprises an air inlet filtration module that is configured to attach to the turbine trailer at a position that is logically before an intake of the turbine air inlet so as to form at least one flow path from an external environment of the air inlet filtration module to the intake of the turbine air inlet, and wherein the air filtration module comprises an enclosure that houses one or more stages of air filtration along the at least one flow path.

16. The power generation station of claim 15, wherein the air inlet filtration module is configured to be detached from the turbine trailer.

17. The power generation station of claim 15, wherein the intake of the turbine air inlet is through a side of the turbine trailer, and wherein the air inlet filtration module is configured to be cantilevered to the side of the turbine trailer so as to cover the intake of the turbine air inlet.

18. A method of aligning and coupling two trailers representing separate portions of a power generation station, wherein the method comprises:
  positioning a first one of the two trailers;
  positioning a second one of the two trailers, such that guide pins in a rear interface of one of the two trailers are within receiving sockets in a rear interface of the other one of the two trailers;
  connecting a first fastening portion of one or more hydraulic cylinders in one of the two trailers to a corresponding second fastening portion in the other one of the two trailers, and pulling the other one of the two trailers towards the one of the two trailers;
  coupling the rear interfaces of the two trailers together;
  adjusting one or more lateral and vertical positioners in the rear interfaces of the two trailers;
  adjusting one or more hydraulic jacks on the two trailers to achieve drivetrain alignment of the two trailers; and
  coupling a portion of a driveshaft in one of the two trailers to a portion of the driveshaft in the other one of the two trailers.

19. The method of claim 18, further comprising, after achieving the drivetrain alignment at an initial time, storing values of output signals from a plurality of inclinometers, installed on the two trailers, in a memory of a control system, wherein the control system is configured to automatically adjust the one or more hydraulic jacks on the two trailers to achieve drivetrain alignments at future times based on the stored values.

20. A power generation station comprising:
  a driveshaft separated into a first portion and a second portion;
  a turbine trailer comprising a turbine compartment housing a turbine, wherein the turbine drives the first portion of the driveshaft; and
  a generator trailer comprising a generator compartment housing a generator, wherein the generator is driven by the second portion of the driveshaft,
  wherein the second portion of the driveshaft is configured to couple and decouple with the first portion of the driveshaft,
  wherein a first rear interface of one of the turbine trailer and the generator trailer comprises at least two guide pins, and wherein a second rear interface of the other one of the turbine trailer and the generator trailer comprises at least two receiving sockets, wherein each of the at least two receiving sockets is configured to receive one of the two guide pins,
wherein one of the first and second rear interfaces comprises at least four vertical positioners configured to, when the two guide pins are received within the two receiving sockets, adjust a vertical alignment between the turbine trailer and the generator trailer, and
wherein each vertical positioner comprises a jacking bolt.

* * * * *